United States Patent
Pan et al.

(10) Patent No.: US 10,536,312 B2
(45) Date of Patent: Jan. 14, 2020

(54) SYSTEM, METHOD, AND APPARATUS FOR LOW POWER CYCLIC PREFIX (CP) BASED HYBRID SPREAD WAVEFORMS

(71) Applicant: IDAC HOLDINGS, INC., Wilmington, DE (US)

(72) Inventors: Kyle Jung-Lin Pan, Saint James, NY (US); Mihaela C. Beluri, Jericho, NY (US); Ravikumar V. Pragada, Warrington, PA (US); Erdem Bala, East Meadow, NY (US); Yugeswar Deenoo, Chalfont, PA (US); Liangping Ma, San Diego, CA (US); Tao Deng, Roslyn, NY (US); Vincent Roy, Longueuil (CA)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 15/780,326

(22) PCT Filed: Dec. 2, 2016

(86) PCT No.: PCT/US2016/064564
§ 371 (c)(1),
(2) Date: May 31, 2018

(87) PCT Pub. No.: WO2017/096131
PCT Pub. Date: Jun. 8, 2017

(65) Prior Publication Data
US 2018/0367355 A1 Dec. 20, 2018

Related U.S. Application Data

(60) Provisional application No. 62/262,655, filed on Dec. 3, 2015.

(51) Int. Cl.
*H04W 52/02* (2009.01)
*H04L 27/26* (2006.01)
*H04L 5/00* (2006.01)

(52) U.S. Cl.
CPC ...... *H04L 27/2611* (2013.01); *H04L 27/2607* (2013.01); *H04W 52/0235* (2013.01);
(Continued)

(58) Field of Classification Search
CPC ........... H04L 25/0222; H04L 25/03006; H04L 25/03343; H04L 25/03821; H04L 27/2605;
(Continued)

(56) References Cited

U.S. PATENT DOCUMENTS 7,756,002 B2 7/2010 Batra et al.
9,313,063 B1* 4/2016 Jia .................. H04L 27/2605
(Continued)

FOREIGN PATENT DOCUMENTS

CN 101848036 A 9/2010
WO WO 2014/124661 A1 8/2014
(Continued)

OTHER PUBLICATIONS

3rd Generation Partnership Project (3GPP), TR 36.872 V12.0.0, "Technical Specification Group Radio Access Network, Small Cell Enhancements for E-UTRA and E-UTRAN—Physical Layer Aspects (Release 12)", Sep. 2013, 78 pages.
(Continued)

*Primary Examiner* — Harun Chowdhury
(74) *Attorney, Agent, or Firm* — Condo Roccia Koptiw LLP

(57) ABSTRACT

Systems, methods, and instrumentalities are disclosed for generating, transmitting, and/or receiving a hybrid spread waveform. The hybrid spread waveform may include a data
(Continued)

portion and a hybrid guard interval (HGI) portion. The HGI portion may include a fixed prefix portion or a fixed suffix portion, and an adaptive low power tail (LPT) portion. The fixed prefix portion or the fixed suffix portion is a low power cyclic prefix (LPCP). The LPCP may be generated at least based on at least the channel delay spread and a power regrowth length. The adaptive LPT portion may be generated using a zero tail (ZT). The LPT is generated by inserting zeros at IFFT or DFT processing stage. A part of the adaptive LPT portion is used to carry data or control information. A waveform may be switched between a hybrid spread waveform and a fixed-CP waveform, e.g., via control signaling.

15 Claims, 35 Drawing Sheets

(52) U.S. Cl.
CPC .......... *H04L 5/0051* (2013.01); *H04L 5/0053* (2013.01); *H04L 27/265* (2013.01); *H04L 27/2615* (2013.01); *H04W 52/0212* (2013.01)

(58) Field of Classification Search
CPC ............... H04L 27/2607; H04L 27/265; H04L 27/2611; H04L 27/2636; H04W 76/27; H04W 52/0235
USPC ......... 370/252, 329, 330, 208, 210; 375/295
See application file for complete search history.

(56) References Cited

U.S. PATENT DOCUMENTS

| | | | |
|---|---|---|---|
| 2009/0082002 | A1 | 3/2009 | Kim et al. |
| 2014/0192848 | A1 | 7/2014 | Rao et al. |
| 2016/0006586 | A1* | 1/2016 | Berardinelli ...... H04L 25/03343 375/295 |
| 2017/0127411 | A1* | 5/2017 | Miao .................. H04L 27/2607 |

FOREIGN PATENT DOCUMENTS

| | | |
|---|---|---|
| WO | WO 2016/040290 A1 | 3/2016 |
| WO | WO 2016/105570 A1 | 6/2016 |
| WO | WO 2016/114824 A1 | 7/2016 |

OTHER PUBLICATIONS

3rd Generation Partnership Project (3GPP), TR 36.942 V11.0.0, "Technical Specification Group Radio Access Network, Evolved Universal Terrestrial Radio Access (E-UTRA), Radio Frequency (RF) System Scenarios (Release 11)", Sep. 2012, 109 pages.

Berardinelli et al., "On the Potential of OFDM Enhancements as 5G Waveforms", IEEE 79th Vehicular Technology Conference (VTC Spring), Seoul, 2014, 5 pages.

Berardinelli et al., "On the Potential of Zero-Tail DFT-Spread-OFDM in 5G Networks", IEEE 80th Vehicular Technology Conference (VTC2014-Fall), Vancouver, BC, 2014, 6 pages.

Berardinelli et al., "Zero-Tail DFT-Spread-OFDM Signals", IEEE Globecom Workshops (GC Wkshps), Atlanta, GA, 2013, pp. 229-234.

Ghosh et al., "Millimeter-Wave Enhanced Local Area Systems: A High-Data-Rate Approach for Future Wireless Networks", IEEE Journal on Selected Areas in Communications, vol. 32, No. 6, Jun. 2014, pp. 1152-1163.

Huemer et al., "The Potential of Unique Words in OFDM", 2010, 5 pages.

Rappaport et al., "Millimeter Wave Mobile Communications for 5G Cellular: It Will Work", IEEE Access Journal, vol. 1, No. 1, May 10, 2013, pp. 335-349.

Samie et al., "Image Encryption", A Communication Perspective, CRC Press, Online available http://file.allitebooks.com/20151012/Image%20Encryption-%20A%20Communication%20Perspective.pdf , 2014, p. 144.

Schwengler, Thomas, "Chapter 8 OFDM", 2016, 21 pages.

\* cited by examiner

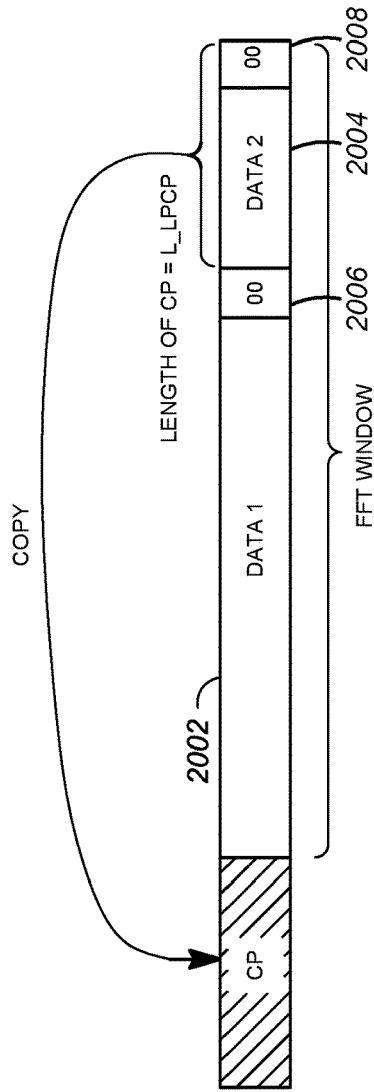
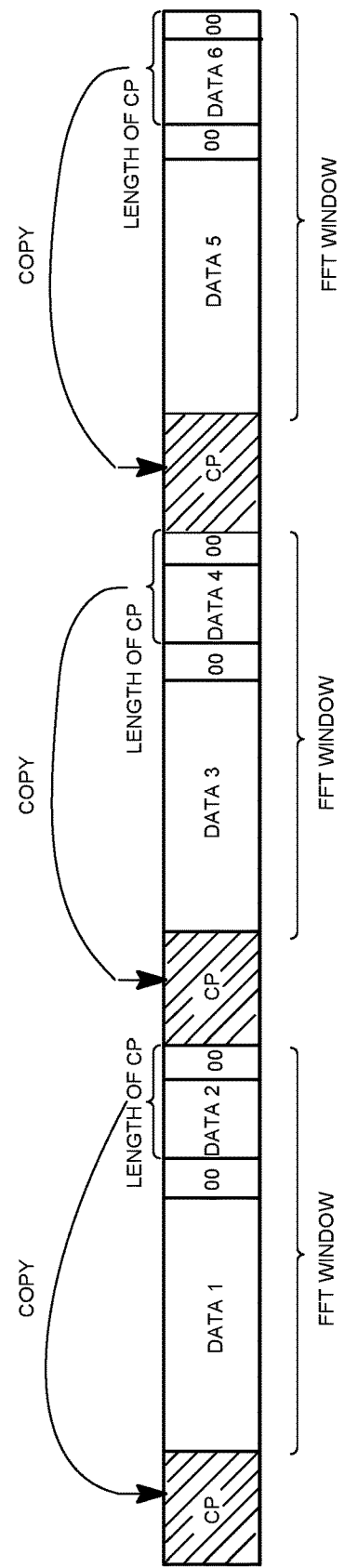
FIG. 20-1
FIG. 20-2

SYSTEM, METHOD, AND APPARATUS FOR LOW POWER CYCLIC PREFIX (CP) BASED HYBRID SPREAD WAVEFORMS

CROSS REFERENCE TO RELATED APPLICATIONS

This application is the National Stage entry under 35 U.S.C. § 371 of Patent Cooperation Treaty Application PCT/US2016/064564, filed Dec. 2, 2016, which claims the benefit of U.S. Provisional Patent Application No. 62/262,655, filed on Dec. 3, 2015, the contents of which are hereby incorporated by reference herein.

BACKGROUND

Orthogonal frequency division multiplexed (OFDM) waveform and discrete Fourier transform-spread-OFDM (DFT-s-OFDM) waveform may utilize fixed cyclic prefix (CP) to preserve cyclicity and/or orthogonality. However, the use of fixed CP length may be inefficient. For example, in line of sight scenarios where delay spread of a channel may be smaller than the fixed CP. The waveforms with fixed CP may be disadvantaged with having a high out of band emission.

Adaptive waveforms like zero tail (ZT) may be used to replace the fixed CP, but such ZT waveforms may suffer from shortcomings, for example, having imperfect zero tails. Such imperfect ZTs may break the cyclicity of the signal and result in error floor. Therefore, there may be a need for a flexible waveform that may be dynamically configured under different channel conditions and may at least provide low out-of-band (OOB) emission systems.

SUMMARY

Systems, methods, and instrumentalities may be provided for generating, transmitting, and/or receiving a hybrid spread waveform, for example, a hybrid-spread-OFDM waveform. The hybrid spread waveform may include a data portion and a hybrid guard interval (HGI) portion. The HGI portion may include a fixed prefix portion or a fixed suffix portion, and an adaptive low power tail (LPT) portion. The fixed prefix portion or the fixed suffix portion may be a low power cyclic prefix (LPCP). The LPCP may be generated at least based on at least the channel delay spread and a power regrowth length. The adaptive LPT portion may be generated using a zero tail (ZT). The LPT may be generated by inserting zeros at inverse fast Fourier transform (IFFT) or discrete Fourier transform (DFT) processing stage. A part of the adaptive LPT portion is used to carry data or control information.

One or more of the hybrid guard interval (HGI) length, an adaptive low power tail (LPT) length, or an indication of a number of zeros inserted before fast Fourier transform (FFT) or discrete Fourier transform (DFT) may be received via one or more of a physical layer (PHY) control channel, MAC layer signaling or higher layer signaling (e.g., radio resource control (RRC) signaling).

A symbol duration may comprise one or more of a data portion, an adaptive LPT portion, a fixed prefix portion or the fixed suffix portion. The symbol duration may be fixed. The fixed prefix portion may be a zero power prefix. The zero power prefix is generated based on zero padding (ZP).

The waveform may be switched (e.g., seamlessly switched) between a hybrid spread waveform and a fixed-cyclic prefix (CP) waveform, e.g., via control signaling.

BRIEF DESCRIPTION OF THE DRAWINGS

A more detailed understanding may be had from the following description, given by way of example in conjunction with the accompanying drawings.

FIG. 20-1 illustrates an example symbol structure.

FIG. 20-2 illustrates an example of a sequence of symbols.

FIG. 20-3 illustrates an example of creating two fragments of zeros.

DETAILED DESCRIPTION OF ILLUSTRATIVE EMBODIMENTS

A detailed description of illustrative embodiments will now be described with reference to the various figures. Although this description provides a detailed example of possible implementations, it should be noted that the details are intended to be exemplary and in no way limit the scope of the application. In addition, the figures may illustrate flow charts, which are meant to be exemplary. Other embodiments may be used. The order of the messages may be varied where appropriate. Messages may be omitted if not needed, and, additional flows may be added.

Figure 1A:
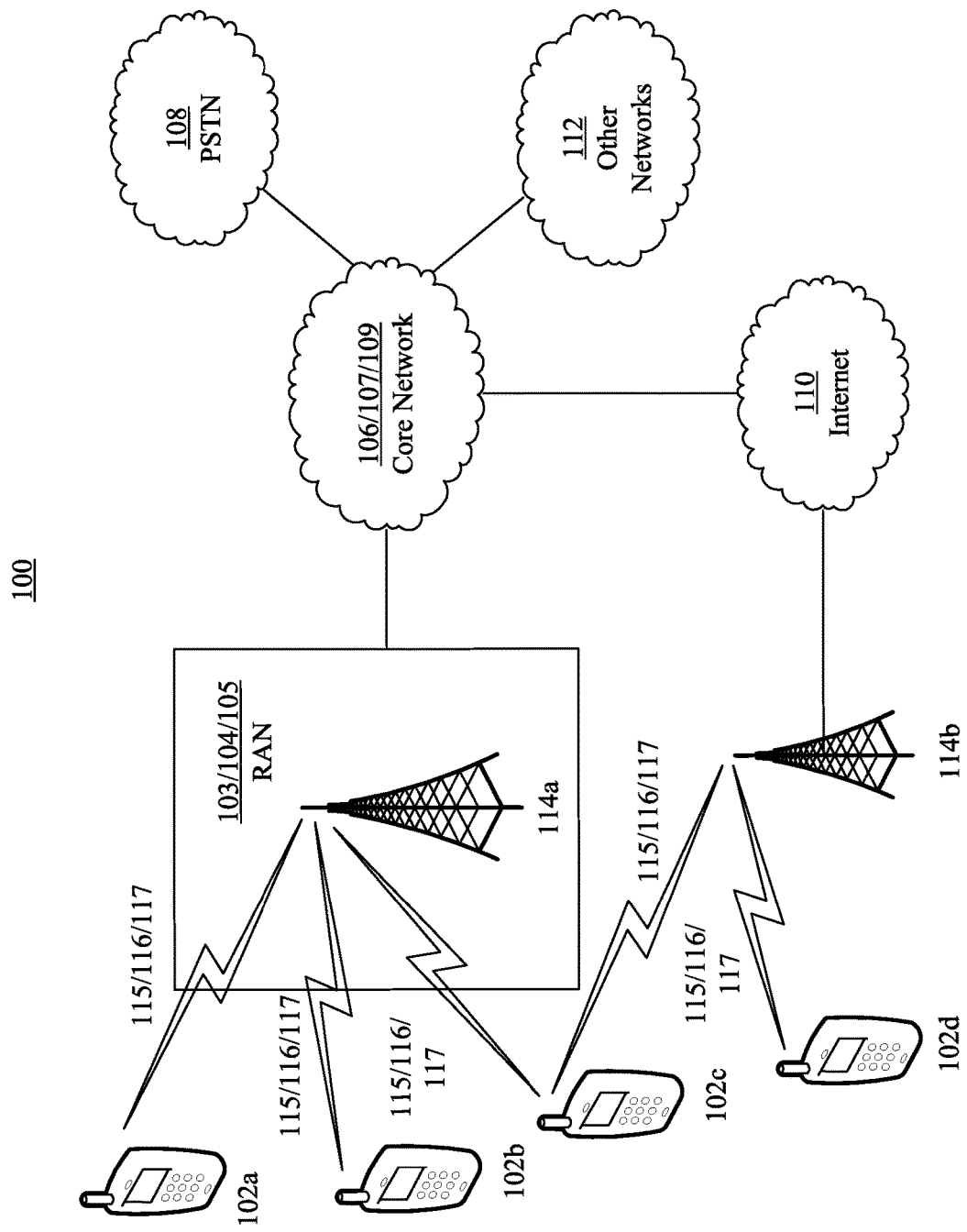
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
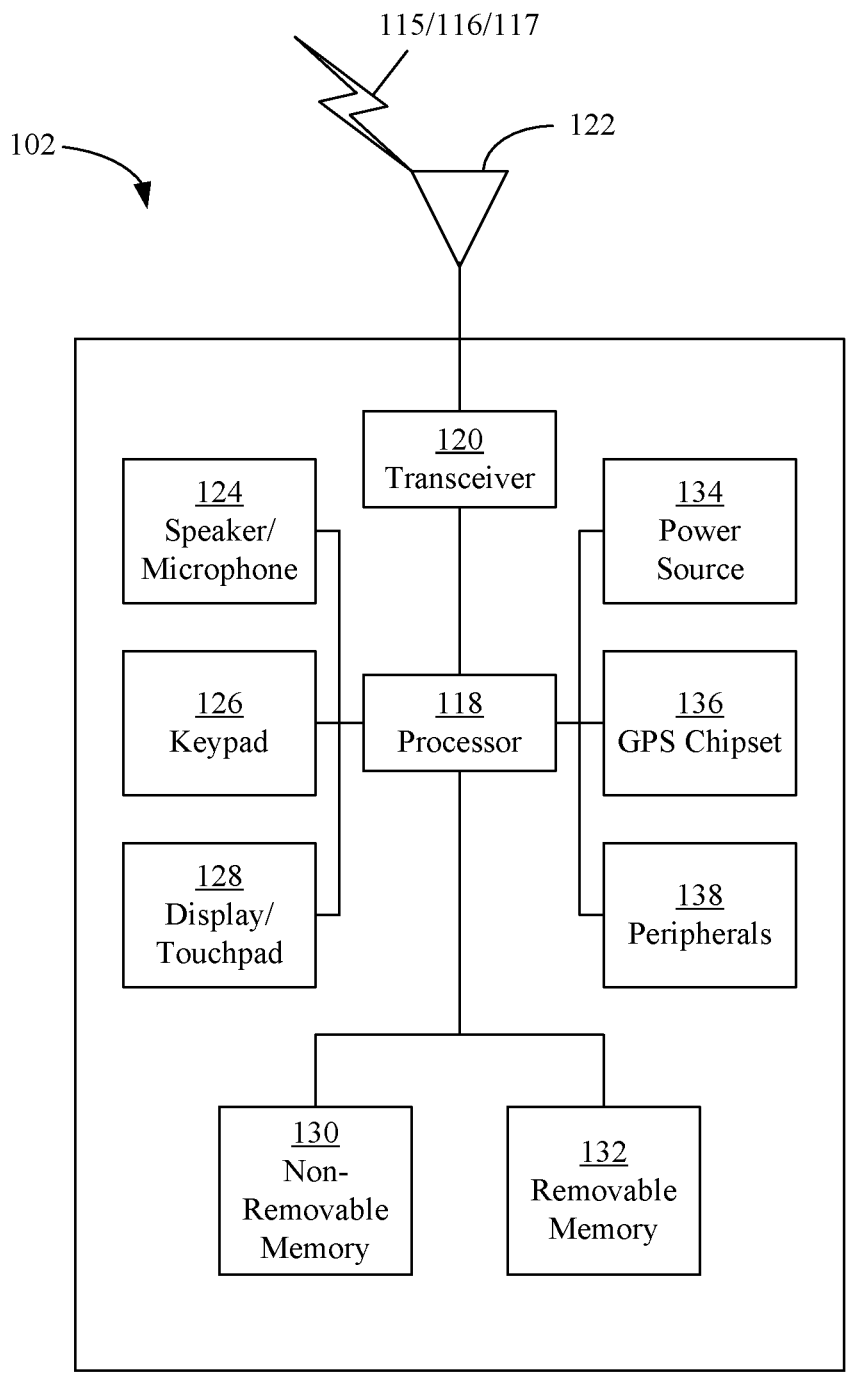
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
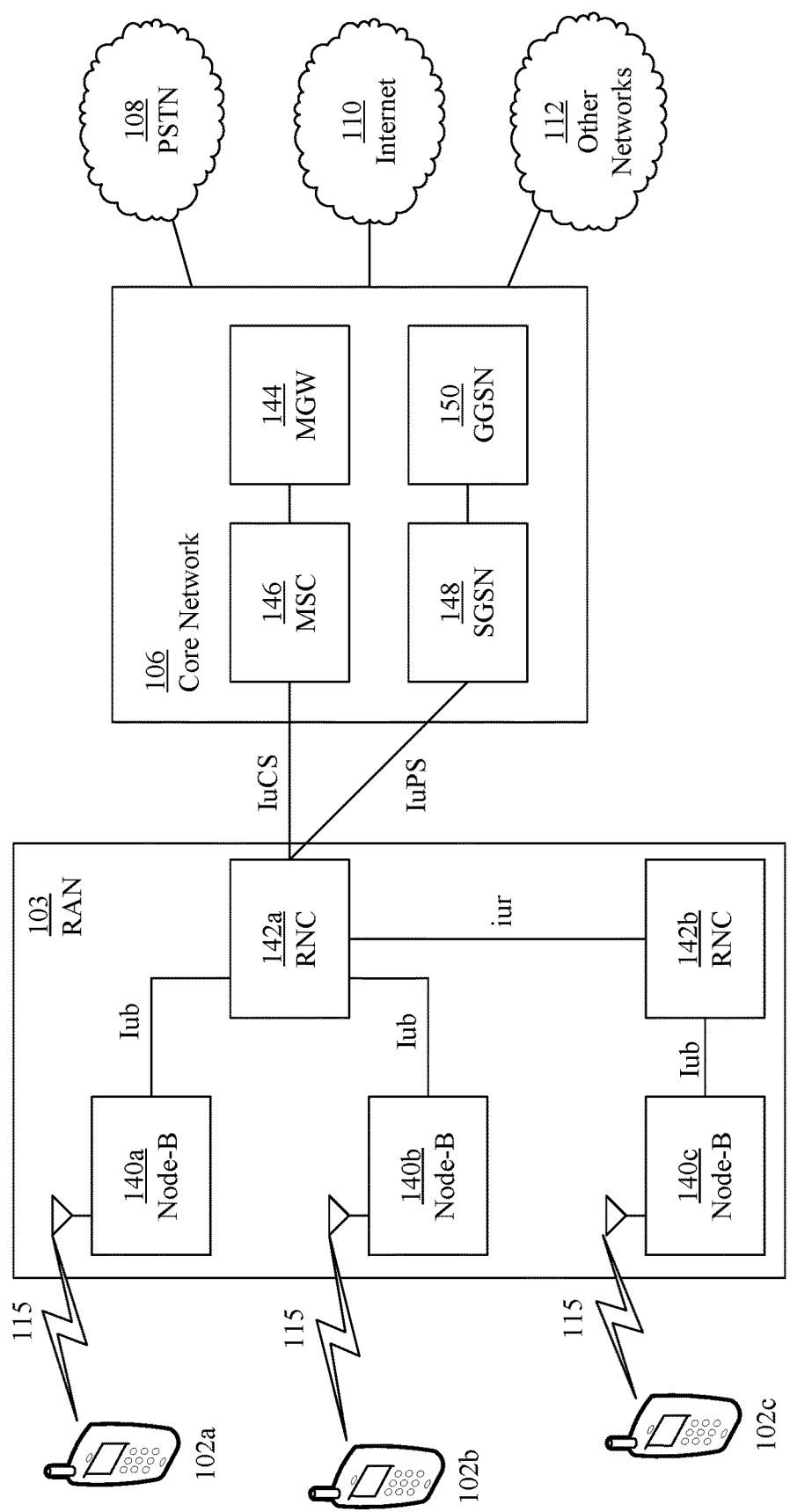
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
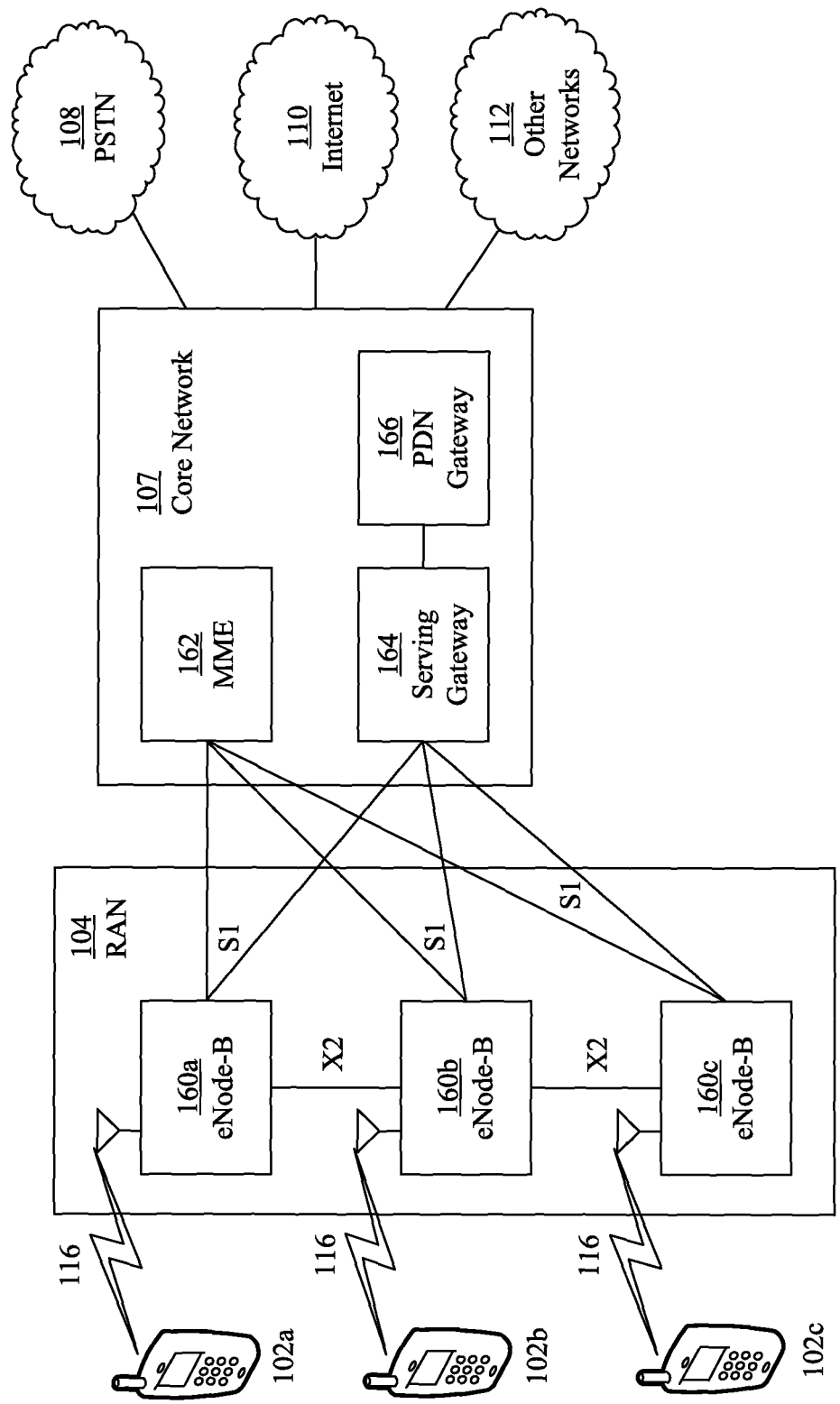
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the Si interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
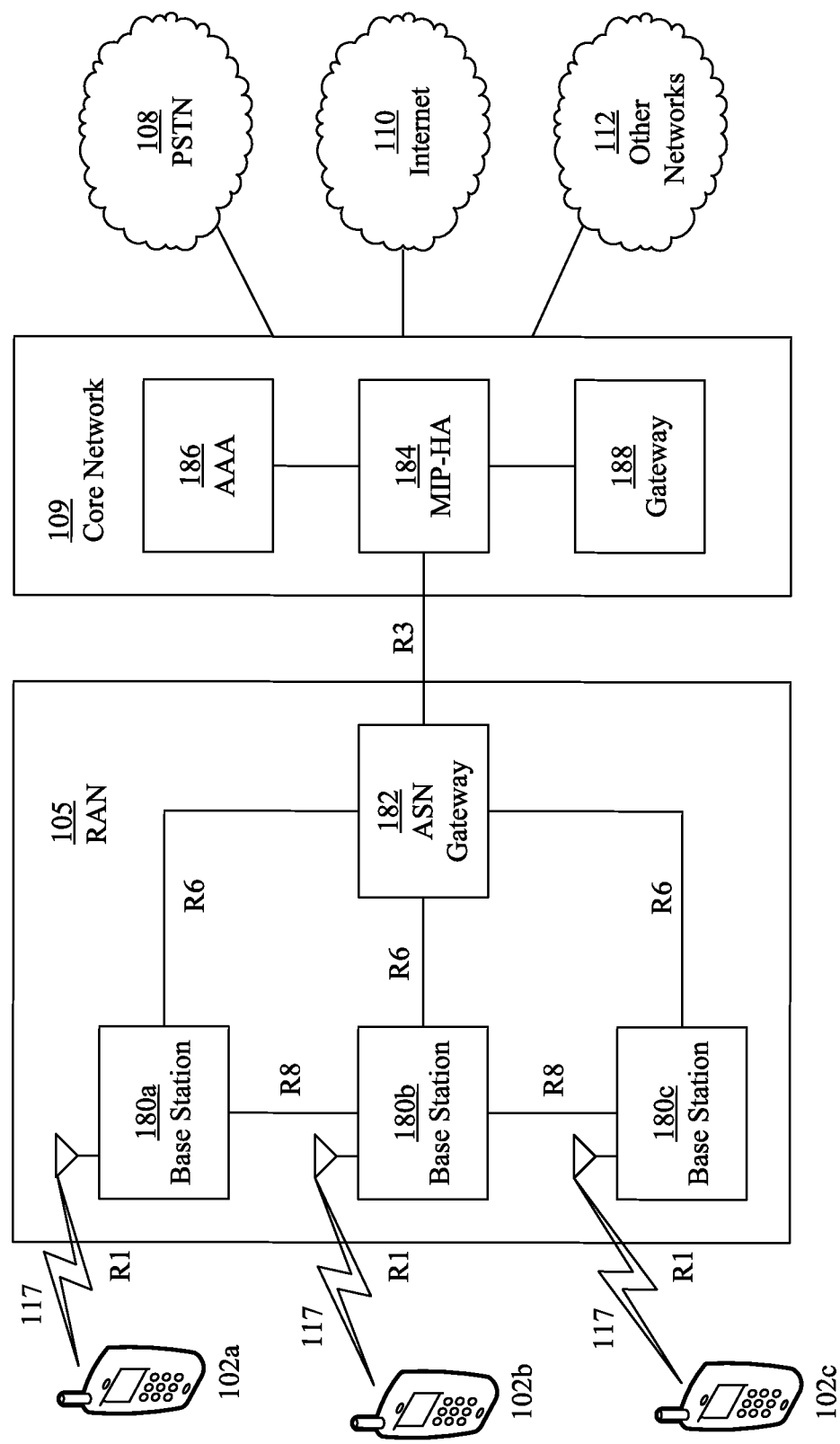
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like.

The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Bandwidths available at above-6 GHz frequencies, e.g., at centimeter wave (cmW) frequency and/or millimeter wave (mmW) frequency may be leveraged to achieve greater data rates and increased capacity. Various techniques may be considered to leverage the large bandwidths available at above-6 GHz frequencies, e.g., in order to meet the data rate (e.g., high data rate) that may be required for the next generation of cellular communication systems.

The large bandwidth that may be available at these frequencies may provide substantial improvements for user-specific data transmission. However, one of the challenges of using the above-6 GHz frequencies may be the propagation characteristics that may be unfavorable for wireless communication, especially in an outdoor environment. For example, higher frequency transmissions may experience higher free space path loss. Rainfall and/or atmospheric gasses (e.g., oxygen) may add further attenuation, and foliage may cause attenuation and/or depolarization. Narrow beam patterns, which may be used to counter these losses, may pose challenges for a base station (e.g., eNB) in delivering cell-specific and/or broadcast information. mmW access link system design (e.g., initial mmW access link system design) may focus on cellular systems that enable add-on mmW data transmission (e.g., at least downlink transmission) to an existing network, e.g., a small cell LTE network.

Examples of mmW Deployment may be provided. For example, a Small Cell mmW eNB (e.g., SCmB) deployment may be based on a small cell deployment (e.g., a Third Generation Partnership Project (3GPP), release 12 (R12) based small cell deployment). mmW operation may be performed, for example, by two network nodes.

A first network node may be a small Cell mmW eNB (SCmB). For small cell mmW eNB (SCmB), an LTE small cell eNB may be capable of operating an mmW air interface in parallel with an LTE air interface. Equipped with an advanced antenna configuration and/or beamforming technique, the SCmB may transmit (e.g., simultaneously transmit) LTE downlink channels in a wide beam pattern and mmW channels in narrow beam patterns. The SCmB may support features and/or procedures in the LTE uplink operation, e.g., in order to support mmW UEs (mUEs) and/or mmW WTRUs (mWTRUs) without mmW uplink transmission.

A second network node may be a mUE or an mWTRU. mUE and mWTRU may be terms that are used interchangeably herein. For mmW WTRU, a WTRU may be capable of operating LTE and mmW air interface in parallel. The mWTRU may have two sets of antennas and/or the accompanied RF chains: one operating in the LTE band and/or the other in the mmW frequency band. There may be two independent baseband processing functions. The two baseband functions may share certain hardware blocks, e.g., if the mmW air interface bears similarity with the LTE system.

The add-on mmW channels may be an extension of the LTE carrier aggregation scheme, e.g., with a carrier type in the mmW frequency band that may apply a different air interface. mmW channels may lend themselves to opportunistic use for high-throughput and/or low-latency traffic data application.

Control signaling may be carried in LTE channels. For example, control signaling including system information update, paging, RRC, and/or NAS signaling (e.g., signaling radio bearers) and/or multicast traffic may be carried in LTE channels. mmW L1 control signaling may be carried in LTE channels.

A SCmB and/or an mWTRU may employ narrow beamforming. For example, the SCmB and/or the mWTRU may employ narrow beamforming due to the high propagation loss (e.g., in NLOS at mmW frequency band). The SCmB and/or the mWTRU may employ narrow beamforming to provide sufficient link budget for high-throughput and/or low-latency data transmission.

Transmit and receive narrow beam pairing may be provided. In urban areas, for example, at 28 GHz and/or 38 GHz, a consistent coverage with a cell-radius of up to 200 meters may be achieved using steerable 10°-beamwidth and 24.5-dBi horn antenna at the transmitter and the receiver.

Figure 2:
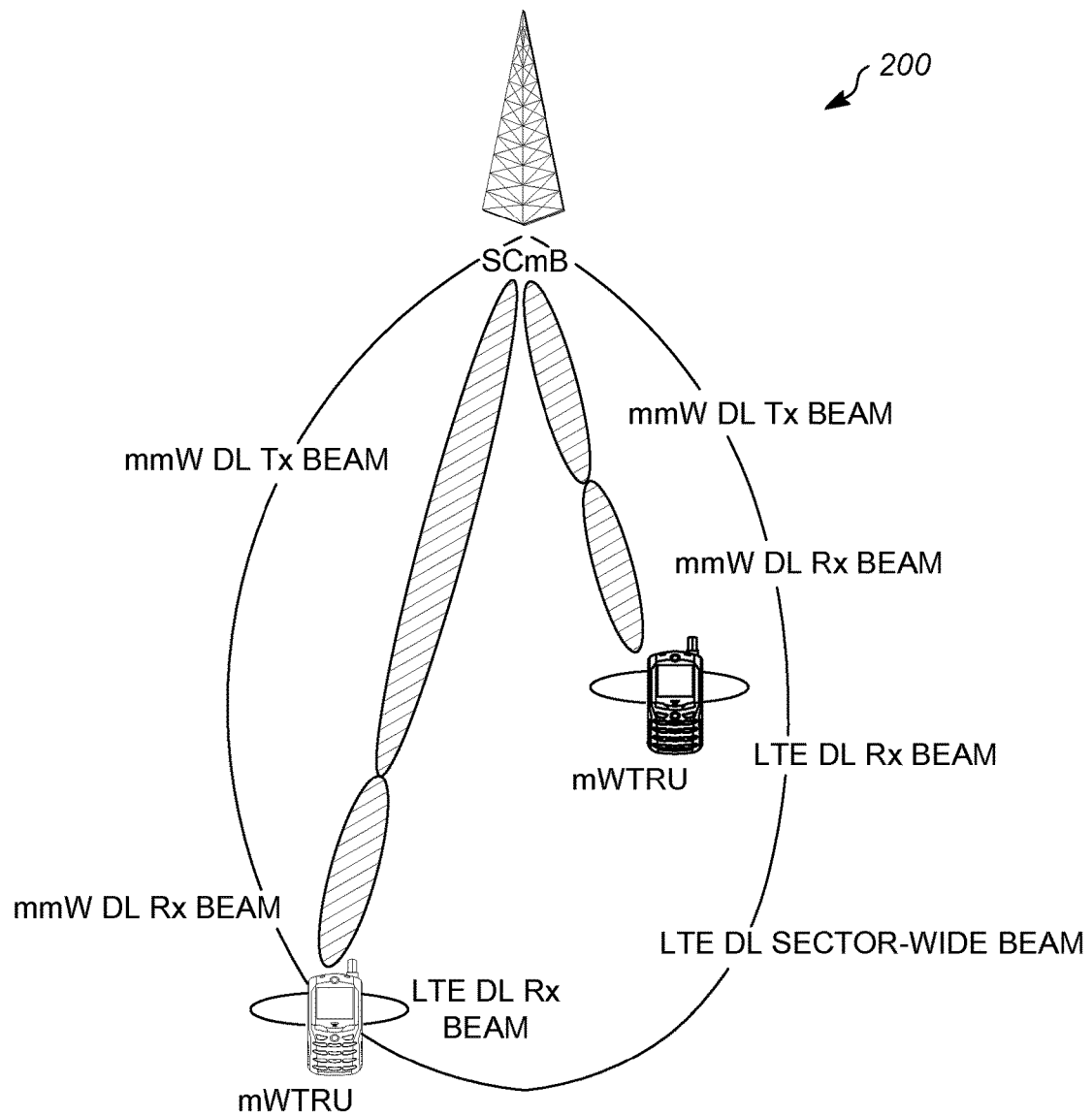
FIG. 2 illustrates a system diagram of a millimeter wave (mmW) small cell deployment.

FIG. 2 illustrates an exemplary SCmB deployment 200. As illustrated in FIG. 2, in addition to downlink transmit and receive narrow beam used by the SCmB and the mWTRUs, respectively, the SCmB and the mWTRUs may apply broad beam pattern for the traditional LTE operation including cell search, random access, cell selection/reselection, etc.

Figure 3:
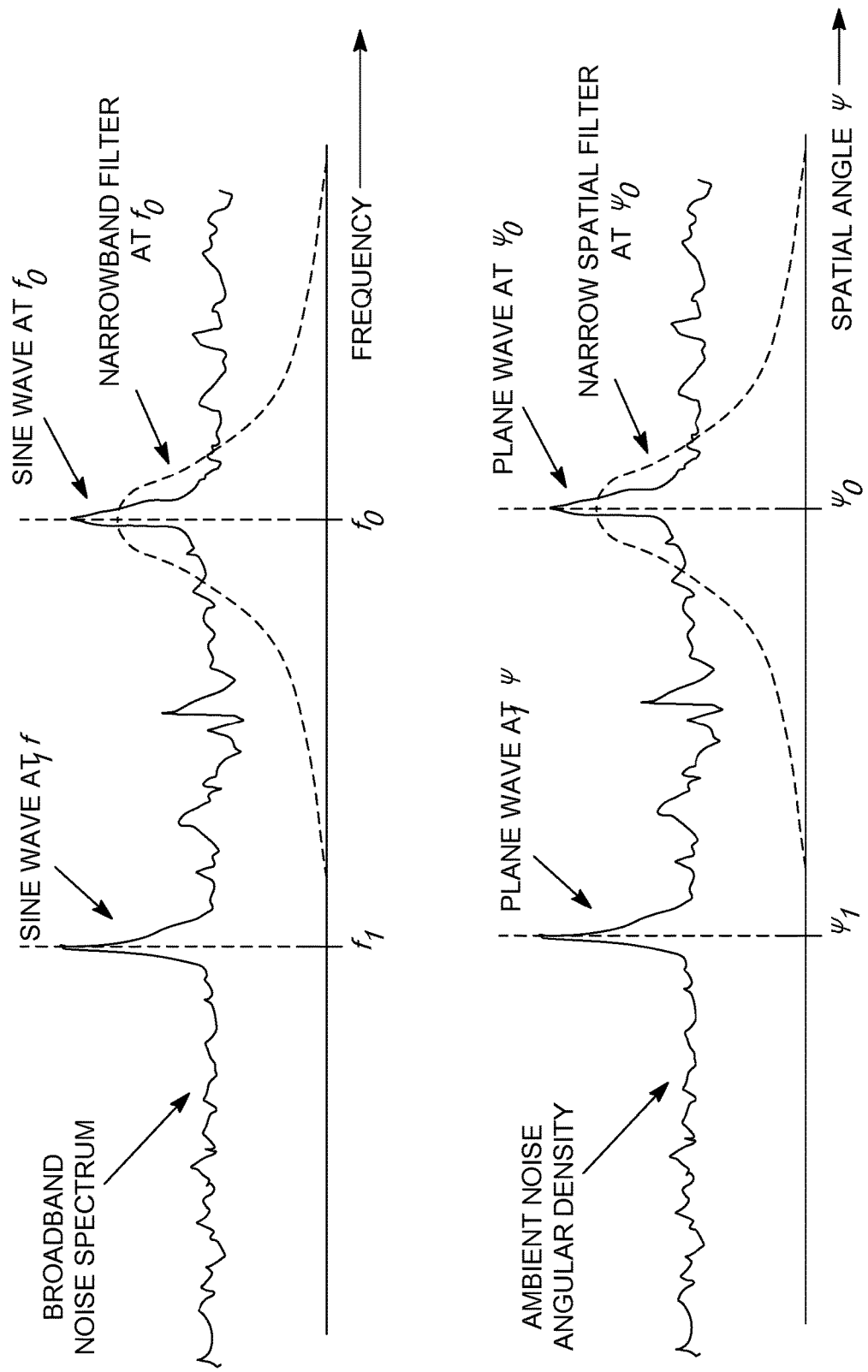
FIG. 3 illustrates an example comparison of frequency and spatial filtering.

The mWTRU receive beam forming may be regarded as a narrow spatial filtering, as illustrated in FIG. 3. A comparison with frequency domain filtering is illustrated in FIG. 3 to demonstrate the effect of a spatial or angular filtering.

As illustrated in FIG. 3, similar to frequency filtering removing unwanted frequency components, spatial filtering may allow an mWTRU to detect a channel impulse response, e.g., at a distinct angular direction captured by the narrow receive beam. This may result in a flat effective channel by excluding angular incoming paths outside of the mWTRU's beam width. A WTRU (e.g., a R12 LTE WTRU) may have an omni-directional receive beam pattern and/or may perceive a superimposed channel impulse response over the entire angular domain. An aligned mmW transmit and receive beam pair may provide an additional degree of freedom in the angular domain, e.g., as compared with an LTE system.

An mmW system (e.g., downlink system) design may focus on integrating directivity, e.g., the directivity of a narrow transmit and/or receive beam pair, into cellular system procedures. This may include layer one (L1) control signaling, data scheduling, narrow beam pairing, beam measurement, L1 control information feedback, etc.

Exemplary mmW system parameters and/or assumptions may be provided. The parameters and/or assumptions may change. These parameters and/or assumptions may not be intended to be limiting, but may serve to illustrate one or more possible set of parameters and/or assumptions of an example mmW system. An exemplary mmW system parameter and/or assumption may be carrier frequency. Carrier frequency may be 28 GHz (e.g., intended for an exemplary system numerology). The design may extend to other mmW frequencies, e.g., 38 GHz, 60 GHz, 72 GHz, etc. An example mmW system parameter and/or assumption may be system bandwidth. System bandwidth may be variable, e.g., up to 1 GHz with aggregation to higher bandwidth. An example mmW system parameter and/or assumption may be estimated RMS delay spread. Estimated RMS delay spread may be 100-200 ns with narrow beam pattern. An example mmW system parameter and/or assumption may be required latency (e.g., 1 ms). An example mmW system parameter and/or assumption may be waveform. Waveform may be OFDM-based and/or broad-band-single-carrier-based. An example mmW system parameter and/or assumption may be connectivity. Connectivity may be, e.g., LTE Small Cell eNB with mmW add-on channels, and/or two separate antennas and/or RF chains connected to two different antenna solutions. An example mmW system parameter and/or assumption may be data rates (e.g., DL minimum 30 Mbit/s, for at least 95% of mWTRUs). An example mmW system parameter and/or assumption may be mobility (e.g., optimized data connection at 3 km/h and/or maintain connection at 30 km/h). An example mmW system parameter and/or assumption may be coverage. Coverage may, for example, meet data rate and/or mobility requirements with less than 100-m cell radius.

Frame structure for the system may depend on the applied waveform. A transmission time interval (TTI) length (e.g., 100 us) may be used, for example to achieve low latency. A system bandwidth (e.g., one in the range of 50 MHz to 2 GHz) may be used, for example, to achieve high data rates.

An OFDM frame structure may be provided. An mmW frame structure of an OFDM-based waveform may provide flexibility, e.g., in coordination between LTE and/or mmW channels. An mmW frame structure of an OFDM-based waveform may provide common functional block sharing, e.g., in an mWTRU device.

An mmW sampling frequency may be selected as an integer multiple of the LTE minimum sampling frequency of 1.92 MHz. Such sampling frequency may lead to an mmW OFDM sub-carrier spacing Δf being an integer multiple of the LTE sub-carrier spacing of 15 kHz, e.g. Δf=15*K kHz. The selection of the integer multiple K and/or the resulting Δf may take into consideration the sensitivity to the Doppler shift, different types of frequency errors, and/or the ability to remove channel time dispersion. The orthogonality between sub-carriers may deteriorate and/or inter-sub-carrier interference may increase when the Doppler shift increases, e.g., in proportion to the sub-carrier spacing. For example, the maximum Doppler shift at 30 km/h for 28 GHz may be 778 Hz. An example 28-GHz channel time dispersion measurement in a dense urban area may indicate that the RMS delay spread 6 may be between 100 and 200 ns (e.g., up to 200-m cell radius). The 90% coherence bandwidth may be estimated at $\frac{1}{50}\sigma$ of 100 kHz and/or the 50% coherence bandwidth at $\frac{1}{5}\sigma$ of 1 MHz.

A sub-carrier spacing Δf between 100 kHz and 1 MHz may be reasonable. A sub-carrier spacing of 300 kHz (K=20) may be robust, e.g., against Doppler shift and/or other types of frequency error and/or to reduce the implementation complexity. The corresponding symbol length (1/Δf) may be 3.33 us.

A cyclic prefix (CP) length may span over a length (e.g., the entire length) of the channel time dispersion, e.g., in order to attempt to eliminate the inter-symbol-interference. A long CP may cause excessive system overhead, e.g., as a CP does not carry useful data. An example of CP length for a $T_{symbol}$ of 3.33 us may be selected at $\frac{1}{14}$ of $T_{symbol}$, 0.24 us and/or the corresponding CP overhead may be 7%, as calculated by $T_{CP}/(T_{CP}+T_{symbol})$.

TTI length of an mmW transmission may be reduced (e.g., reduced significantly) compared to the 1-ms TTI length of the LTE system. The TTI length may be reduced to achieve low latency. An mmW sub-frame length of 1 ms may be used to align with the LTE 1-ms sub-frame timing. The mmW sub-frame may include multiple mmW TTIs. The length the mmW TTIs may be tied to one or more parameters including for example, sub-carrier spacing, symbol length, CP length, FFT size, etc.

Table 1 illustrates an exemplary mmW downlink OFDM numerology with a conservative CP length (e.g., 4x channel delay spread). The CP length selection may be based on the assumption that the delay spread over potential mmW frequency bands may be lower than 200 ns.

TABLE 1

| OFDM Numerology Parameters | | | | |
|---|---|---|---|---|
| System bandwidth (MHz) | 125 | 250 | 500 | 1000 |
| Sampling rate (MHz) | 153.6 | 307.2 | 614.4 | 1228.8 |
| Sub-carrier spacing (kHz) | 300 | 300 | 300 | 300 |
| Number of sub-carrier per RB | 12 | 12 | 12 | 12 |
| RB bandwidth (MHz) | 3.6 | 3.6 | 3.6 | 3.6 |
| Number of assignable RBs | 32 | 64 | 128 | 256 |
| Number of occupied sub-carriers | 384 | 768 | 1536 | 3072 |
| Occupied bandwidth (MHz) | 115.2 | 230.4 | 460.8 | 921.6 |
| IDFT(Tx)/DFT(Rx) size | 512 | 1024 | 2048 | 4096 |
| OFDM symbol duration (us) | 3.333 | 3.333 | 3.333 | 3.333 |
| CP length (ratio to symbol length) | 1/4 | 1/4 | 1/4 | 1/4 |
| CP length (us) | 0.833 | 0.833 | 0.833 | 0.833 |
| Number of symbols per slot | 24 | 24 | 24 | 24 |
| Slot duration (us) | 100 | 100 | 100 | 100 |
| Sub-frame duration (ms) | 1 | 1 | 1 | 1 |
| Number of slots per sub-frame | 10 | 10 | 10 | 10 |
| Frame duration (ms) | 10 | 10 | 10 | 10 |
| Number of sub-frames per frame | 10 | 10 | 10 | 10 |
| Number of symbols per TTI per RB | 288 | 288 | 288 | 288 |
| Number of symbols per TTI using all RBs | 9216 | 18432 | 36864 | 73728 |
| Signaling overhead | 20% | 20% | 20% | 20% |
| Data rate using uncoded 64QAM (Mbps) | 442.368 | 884.736 | 1769.472 | 3538.944 |
| Spectral efficiency | 3.538944 | 3.538944 | 3.538944 | 3.538944 |

Figure 4:
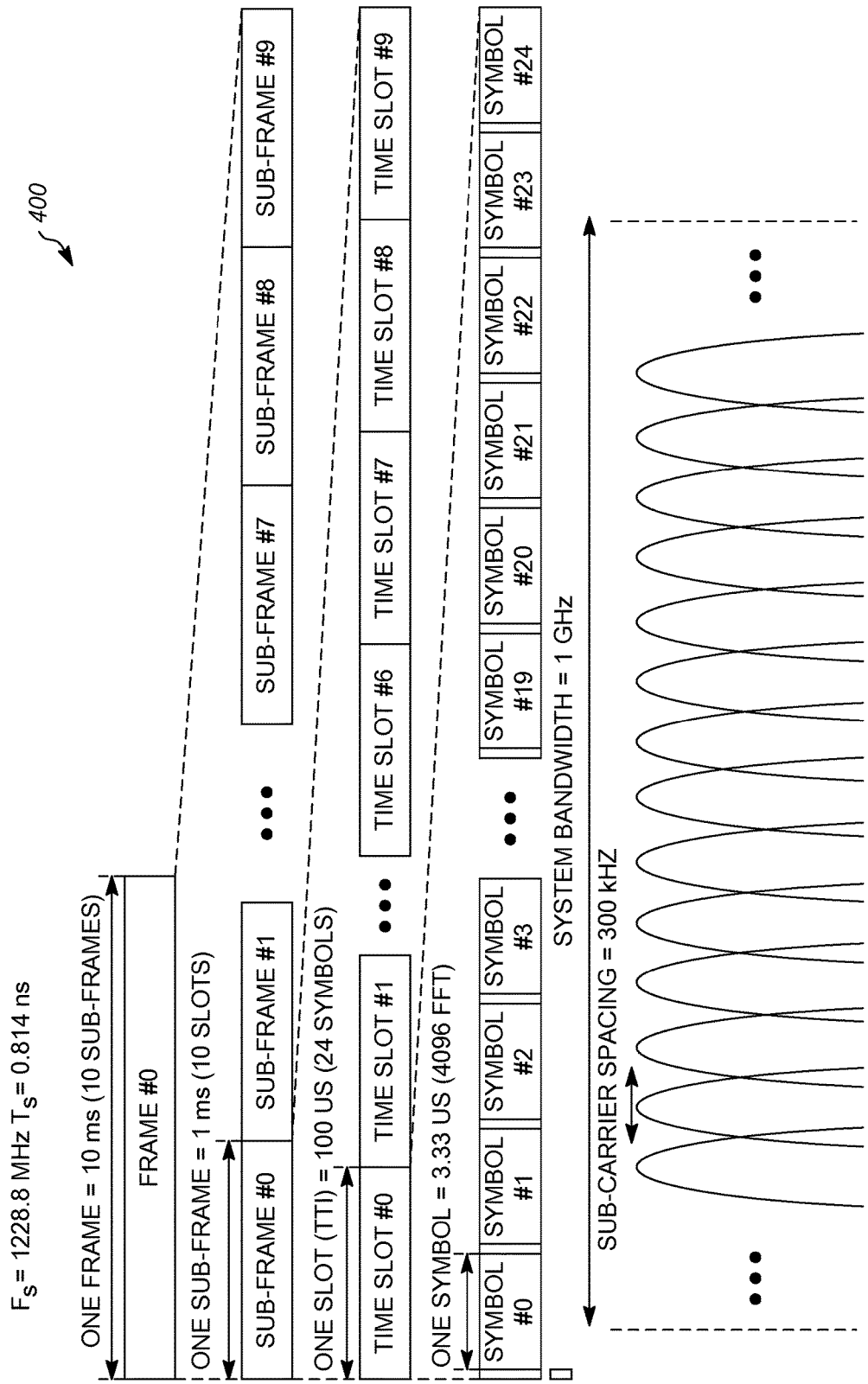
FIG. 4 illustrates an example orthogonal frequency division multiplexing (OFDM) frame structure.

FIG. 4 illustrates an exemplary frame structure 400 corresponding to the example disclosed in Table 1. In the example, the system bandwidth may be 1 GHz, and/or a sub-carrier spacing of 300 kHz, with a corresponding symbol length of 3.33 us, may be used. An example cyclic prefix (CP) length of ¼ of $T_{symbol}$ which equals 0.833 us may be used.

The frame structure may assume an OFDM-based mmW waveform, which may be incorporated into the OFDM-based LTE small cell network. The system procedure design proposed may not be bound by this frame structure and/or may be applied to other waveform candidates.

mmW physical channels may be provided. A SCmB deployment may employ mmW physical layer channels and/or reference signals, as described herein, in addition to the LTE physical channels. For example, beam-specific reference signal (BSRS) may be employed. For beam-specific reference signal, a unique sequence transmitted per transmit beam may be used for beam acquisition, timing/ frequency synchronization, channel estimation for a physical downlink directional control channel (PDDCCH), beam tracking and measurement, etc. A beam-specific reference signal may carry (e.g., implicitly) beam identity beam information. For example, the beam identity information may include a BSRS sequence index. Different types of BSRSs may be provided. The BSRS resource allocation may be pre-defined.

An adaptive antenna reference signal (AARS) may be employed. For adaptive antenna reference signal, a sequence (e.g., a unique sequence) may be scheduled and/or transmitted. The sequence may be scheduled and/or transmitted dynamically. The sequence may be scheduled and/or transmitted for beam pair measurement associated with an antenna port. An adaptive antenna reference signal may have embedded (e.g., implicitly embedded) beam identity information. The beam identity information may be in the sequence index and/or may carry a small payload, e.g., a small payload including the same information.

A physical downlink directional control channel (PDDCCH) may be employed. A PDDCCH may carry data (e.g., all data) related to control information. The control information may be for an mWTRU to identify, demodulate, and/or decode the associated PDDDCH correctly. The PDDCCH may be carried in an mmW narrow beam and/or in a broad beam. The PDDCCH may apply different multiple access. For example, a common PDDCCH transmitted may be transmitted in downlink mmW broad beam covering a sector and/or cell and/or a dedicated PDDCCH transmitted (e.g., only transmitted) in a narrow beam pair, e.g., when mWTRU-specific data is transmitted. The dedicated PDDCCH may carry scheduling information, e.g., for its associated PDDDCH. The dedicated PDDCCH may be carried on a per-TTI basis.

A PDDCCH (e.g., a common PDDCCH) may include cell-specific information, e.g., sector/segment identity and/or beam identity. An mWTRU may determine from the common PDDCCH whether it is scheduled, e.g., for a narrow beam pairing procedure, e.g., to begin a narrow beam data transmission.

A physical downlink directional data channel (PDDDCH) may be employed. The PDDDCH may carry payload information. For example, the payload information may be received as a medium access control protocol data unit (MAC PDU), e.g., from the mmW MAC layer. The resource allocation (e.g., complete resource allocation) of this channel may be determined by the downlink scheduling information, e.g., the downlink scheduling information carried in PDDCCH. The PDDDCH intended for an mWTRU may be transmitted in a narrow Tx beam and/or received in a properly paired narrow Rx beam, e.g., a narrow beam pair. PDDDCHs for different WTRUs in different beam pairs may reuse time, frequency, and/or code resources, for example, due to spatial isolation. Multiple PDDDCHs may operate in one transmit/receive beam pair using multiple access in time, frequency, and/or code domain. A common PDDDCH may be used to carry data. For example, a common PDDDCH may be used to carry data in broad mmW antenna pattern associated with the common PDDCCH.

Demodulation reference signal (DMRS) may be employed. For demodulation reference signal, symbols may be embedded in the transmission for channel estimation for PDDDCH. The signals may be placed in time and/or frequency domain (e.g., both time and frequency domain). The signals may be placed according to a pre-defined pattern, for example, for correct interpolation and/or reconstruction of the channel.

Figure 5:
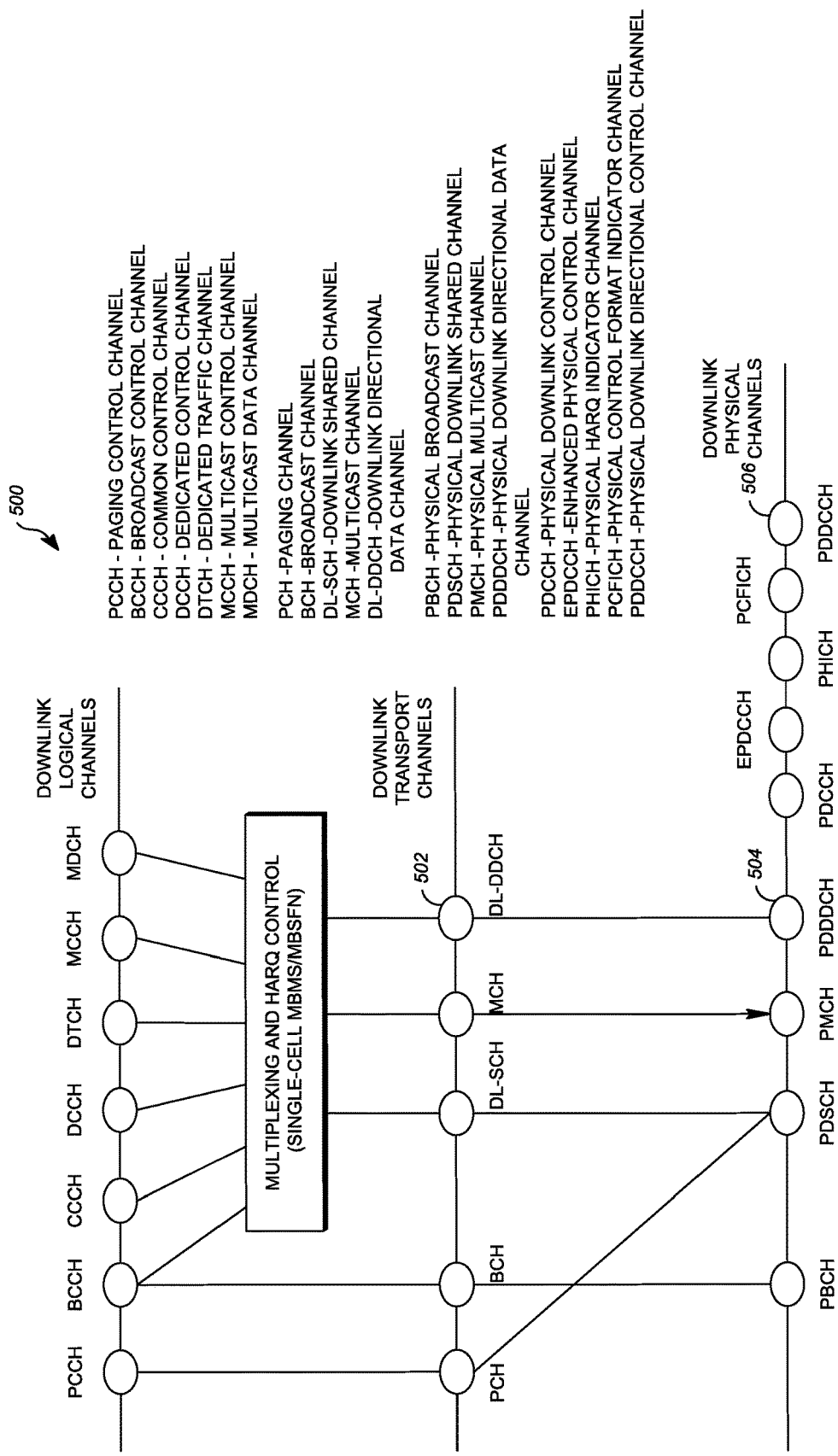
FIG. 5 illustrates an example downlink logical, transport, and physical channels in an mmW system

One or more of channels and/or reference signals in a narrow beam pair may be beamformed (e.g., beamformed identically) and/or considered to be transmitted via a physical antenna port. Carrying broadcast and/or multicast information may not be an optimal application, e.g., given the directivity of the transmission of the channels. The SCmB deployment with mmW downlink data transmission may adopt a channel mapping (e.g., as illustrated in FIG. 5). FIG. 5 illustrates an example downlink logical, transport, and physical channels in an mmW system 500. The mmW channels in FIG. 5 are channels downlink directional data channel (DL-DDCH) 502, physical downlink directional data channel (PDDDCH) 504, and physical downlink directional control channel (PDDCCH) 506.

mWTRU Beamforming may be provided. An mWTRU may use a phase antenna array to achieve beamforming gain. The beamforming gain may be used to compensate high path loss at mmW frequencies, at which the short wavelength allows a compact form factor of a device design. An element spacing of $0.5\lambda$ may be used. A large element spacing, for example, an element spacing of $0.7\lambda$ may be used.

Figure 6:
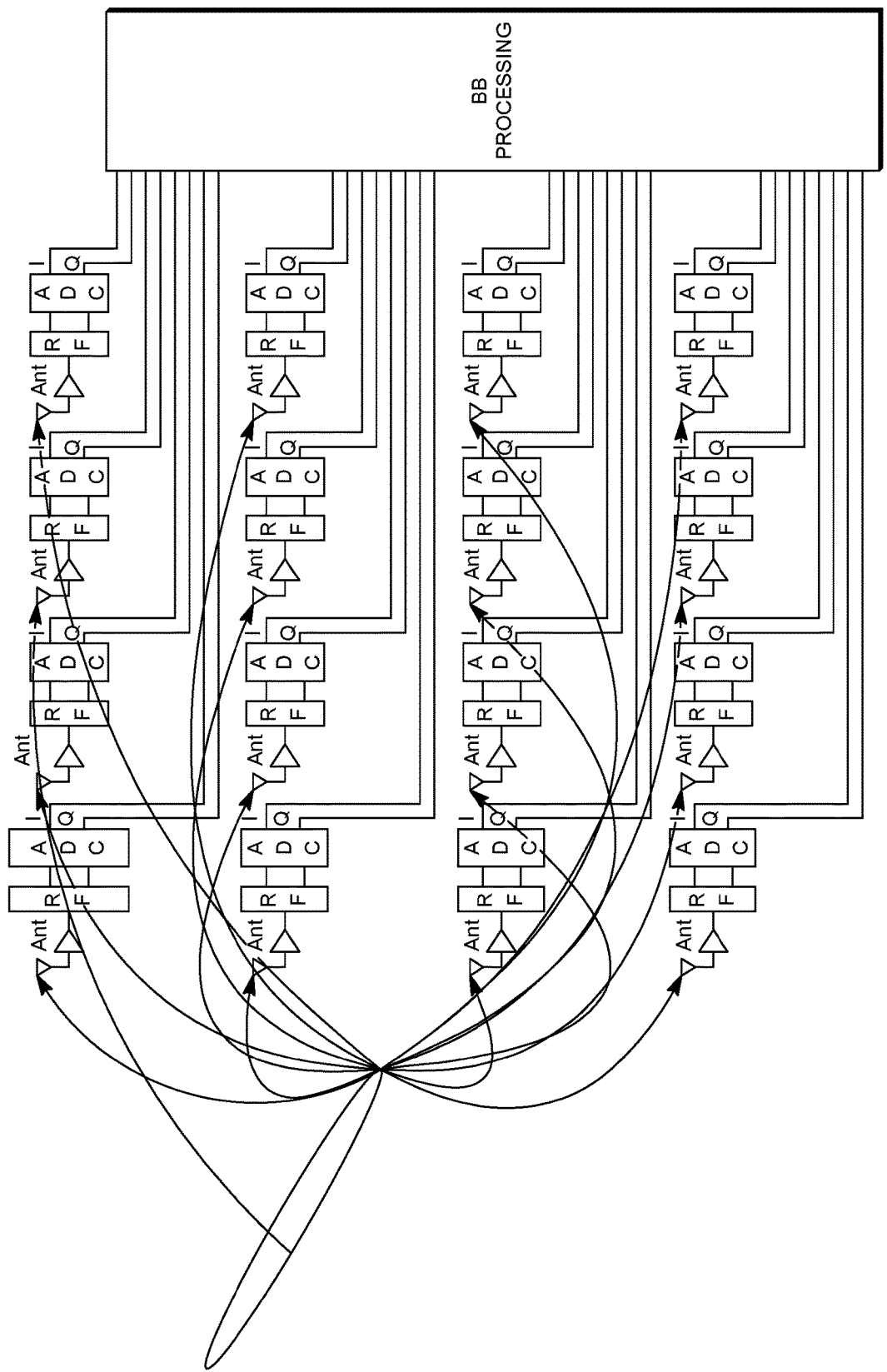
FIG. 6 illustrates an exemplary millimeter WTRU (mWTRU) digitized beamforming.

The phase antenna may apply different beamforming algorithms. As illustrated in FIG. 6, a digitized beamforming approach, for example, for each antenna element, may have an RF chain, for example, a dedicated RF chain, an RF processing unit and/or an ADC. The signal processed by an antenna element may be controlled (e.g., controlled independently) in phase and/or amplitude. The signal processing may be controlled, for example, to optimize the channel capacity.

A configuration may have one or more RF chains. The number of ADCs may be same as the number of antenna elements. While offering very high performance, the mWTRU antenna configuration may impose a cost (e.g., a high cost) and/or complexity in implementation and/or cause high energy consumption in operation.

Figure 7:
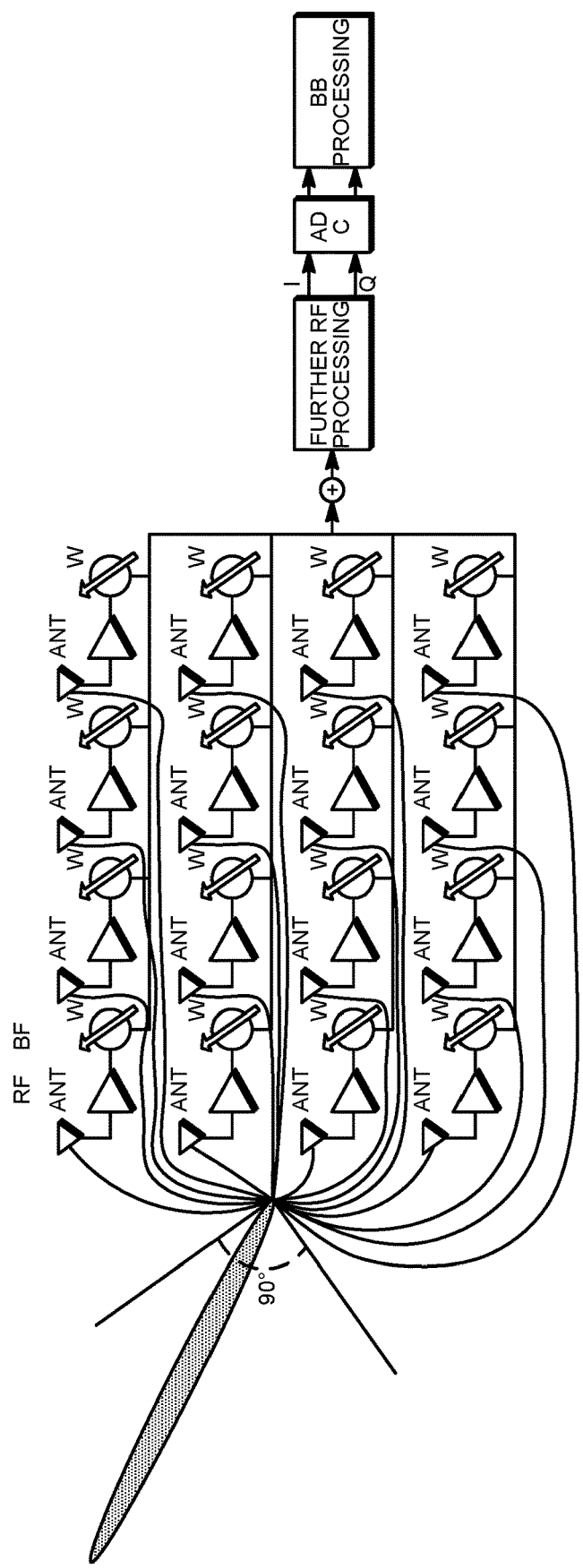
FIG. 7 illustrates an example of mWTRU analog beamforming with one phase antenna array (PAA) and one radio frequency (RF) chain.

FIG. 7 illustrates an example of mWTRU analog beamforming with one phase antenna array (PAA) and one radio frequency (RF) chain. Terms analog and analogue may be used interchangeably. As illustrated in FIG. 7, a practical approach (e.g., analogue beamforming), may apply one or more (e.g., only one) RF chain for a phase antenna array (PAA). An antenna element (e.g., each antenna element) may be connected to a phase shifter, e.g., that may be used to set the weight for beam forming and/or steering. The number of RF chains (e.g., required number of RF chains) and/or the energy consumption may be reduced (e.g., significantly reduced).

In the case of analog beamforming, the phase of the signal at antenna elements (e.g., at each antenna element) may be adjusted. As illustrated in FIG. 7, the phase shifting and/or combining may be implemented in one or more stages including, for example, RF stage, baseband (BB) analog circuit stage, or local oscillator (LO) stage. Each implementation may be evaluated in terms of signal loss, phase error, power consumption, etc.

The mWTRU analog beamforming algorithms may include fixed codebook-based beamforming and/or continuous phase shifting beamforming. Fixed codebook-based beamforming may include a grid of beams comprising a set of fixed beams. Each beam may be formed by the mWTRU, e.g., an mWTRU applying a beamforming weight vector v chosen from a pre-defined codebook $v \in \{v_1, v_2, v_3 \ldots v_N\}$, where N may denote the number of fixed beams. Vectors (e.g., each vector) may include pre-calibrated phase shifts for phase shifters (e.g., all phase shifters) and/or may represent a unique analogue beam direction, e.g., a beam.

The number of beams may depend on the half-power-beamwidth (HPBW) of the beamforming and the desired coverage.

The mWTRU analog beamforming algorithms may include continuous phase shifting beamforming. The weight (e.g., desired weight) of a phase shifter (e.g., each phase shifter) may be calculated based on the estimated short-term channel information and/or converted, for example, using a high resolution digital-to-analog converter (DAC) in order to apply to the phase shifter. Continuous phase shifting beamforming may provide a continuous and/or adaptive beamforming, for example, to track the channel conditions. The algorithm may perform well in scenarios with increased multipath, high angular spread, and/or low WTRU mobility.

Combining of the digitized and/or analog beamforming may be provided. An mWTRU may employ a hybrid approach. The hybrid approach may include analog beamforming performed over the phase array antenna elements. Each of the antenna elements associated with a phase shifter and/or connected (e.g., all connected) to one RF chain, and/or digital precoding applied on the baseband signal of each RF chain, e.g., when there is more than one RF chain. MIMO schemes may be implemented using digital precoding.

System parameters (e.g., basic system parameters) of the hybrid beamforming may include one or more data streams ($N_{DATA}$), one or more RF chains (TRX) ($N_{TRX}$), one or more antenna ports ($N_{AP}$), one or more antenna elements ($N_{AE}$), and/or one or more phase antenna arrays ($N_{PAA}$). The configuration of these parameters may impact the system function and/or performance, as described herein.

In an example, $N_{PAA} \leq N_{AP} \leq N_{TRX} \leq N_{AE}$, a phase antenna array (PAA) (e.g., one PAA) may include multiple antenna elements. For example, a 4×4 PAA may have 16 antenna elements. An antenna port may be defined such that the channel over which a symbol on the antenna port may be conveyed may be inferred from the channel over which another symbol on the same antenna port may be conveyed. One or more resource grids per antenna port may be provided. An LTE based (e.g., an LTE R12 based) antenna port configuration may include a cell-specific reference signal, e.g., a cell-specific reference signal that may support a configuration of one, two, and/or four antenna ports and/or are transmitted on antenna ports p=0, p ∈ {0,1} and p ∈ {0,1,2,3}, respectively. An LTE based (e.g., an LTE R12 based) antenna port configuration may include multicast-broadcast single-frequency network (MBSFN) reference signals, e.g., MBSFN reference signals may be transmitted on antenna port p=4. An LTE based (e.g., an LTE R12 based) antenna port configuration may include WTRU-specific reference signals associated with PDSCH. For example, WTRU-specific reference signals associated with PDSCH may be transmitted on antenna port(s) p=5, p=7, p=8, or one or more of p ∈ {7,8,9,10,11,12,13,14}. An LTE (e.g., an LTE R12) antenna port configuration may include demodulation reference signals, e.g., demodulation reference signals associated with EPDCCH transmitted on one or more of p ∈ {107,108,109,110}. LTE (e.g., an LTE R12) antenna port configuration may include positioning reference signals that may be transmitted on antenna port p=6. LTE (e.g., an LTE R12) antenna port configuration may include CSI reference signals. The CSI reference signals may support a configuration of one, two, four, and/or eight antenna ports that may be transmitted on antenna ports p=15, p ∈ {15,16}, p ∈ {15,16,17,18}, and p ∈ {15,16,17,18,19,20,21,22}, respectively.

An antenna port may carry a beamformed reference signal. For example, a beamformed reference signal associated with the antenna port. The beamformed reference signal may be used to identify the antenna port. The antenna configuration may become a digitalized solution (e.g., fully digitized solution) as shown in FIG. 7, e.g., when the number of TRX equals the number of antenna elements (e.g., one RF chain per antenna element).

Figure 8:
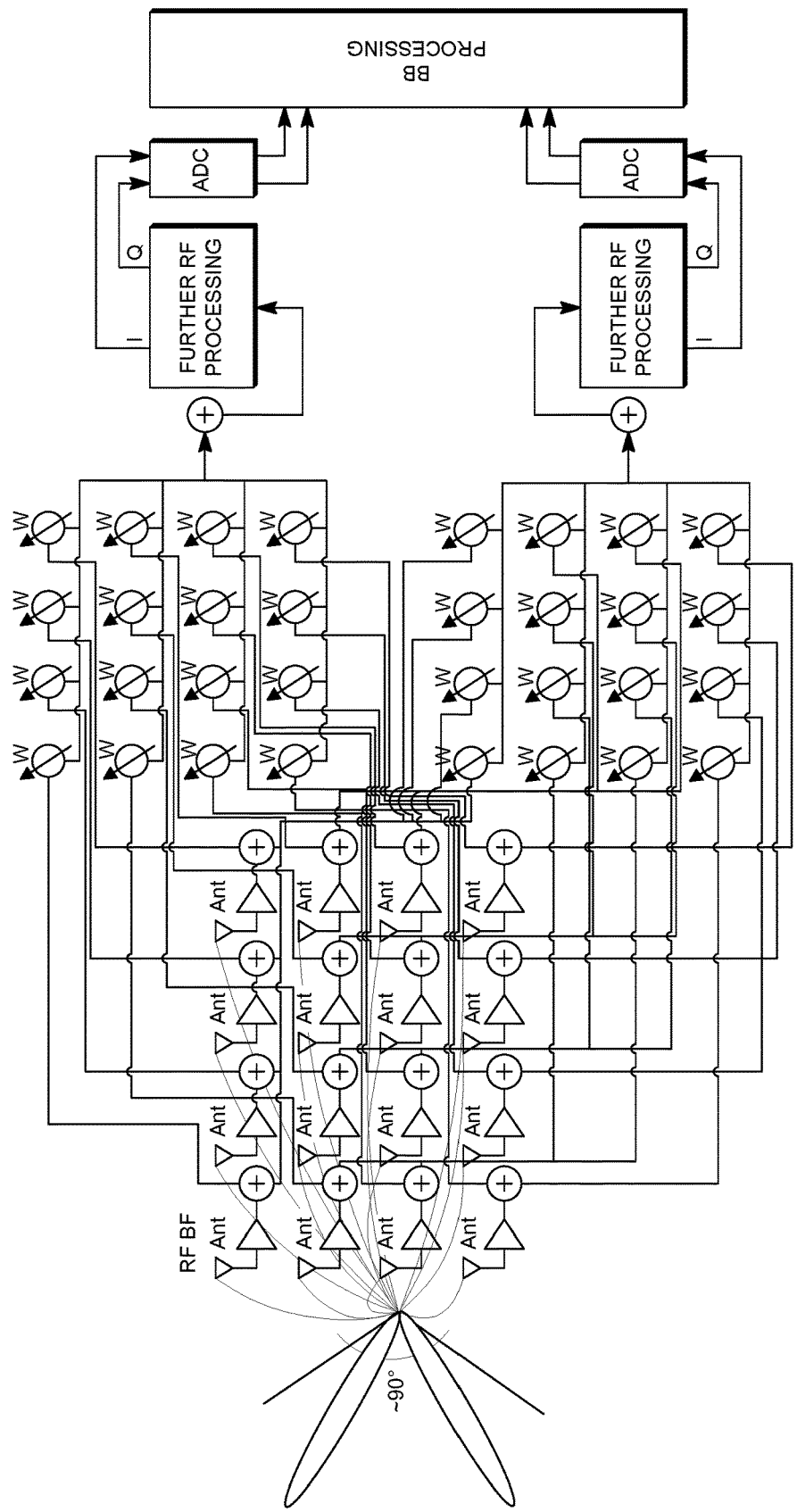
FIG. 8 illustrates an example of mWTRU analog beamforming with one PAA and two RF chains.

A PAA may be connected to one RF chain and/or multiple RF chains, e.g., depending on the system requirement and/or configuration. As illustrated in FIG. 8, a PAA of size 4×4 may be connected to two RF chains. Each RF chain may have a set of one or more (e.g., 16) phase shifters. The PAA may form one or more (e.g., two) narrow beam patterns within a +45° and −45° coverage in azimuth plane. In this configuration, $N_{PAA} < N_{AP} = N_{TRX} < N_{AE}$.

Figure 9:
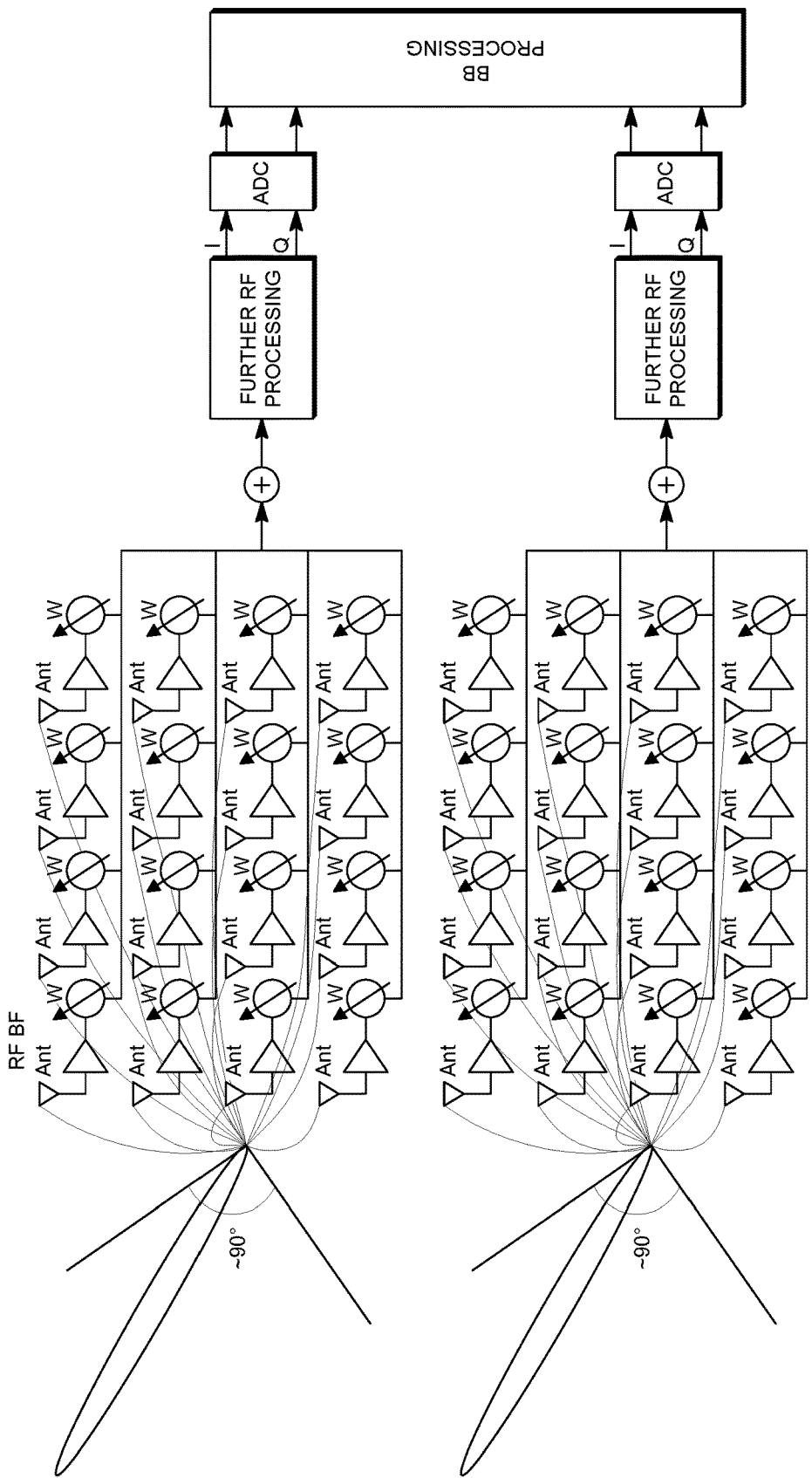
FIG. 9 illustrates an example of mWTRU analog beamforming with two PAAs and two RF chains.

FIG. 9 illustrates an example of two PAAs, wherein each PAA may have a dedicated RF chain, e.g., $N_{PAA} = N_{AP} = N_{TRX} \leq N_{AE}$. This configuration may allow a spatial independence between the two simultaneous beams, e.g., by placing the PAAs at different orientation (e.g., in the azimuth plane). An aligned PAA arrangement may provide an aggregated larger coverage compared to the configuration in FIG. 8. Configurations (e.g., both configurations with two RF chains) may apply MIMO with two data streams.

Figure 10:
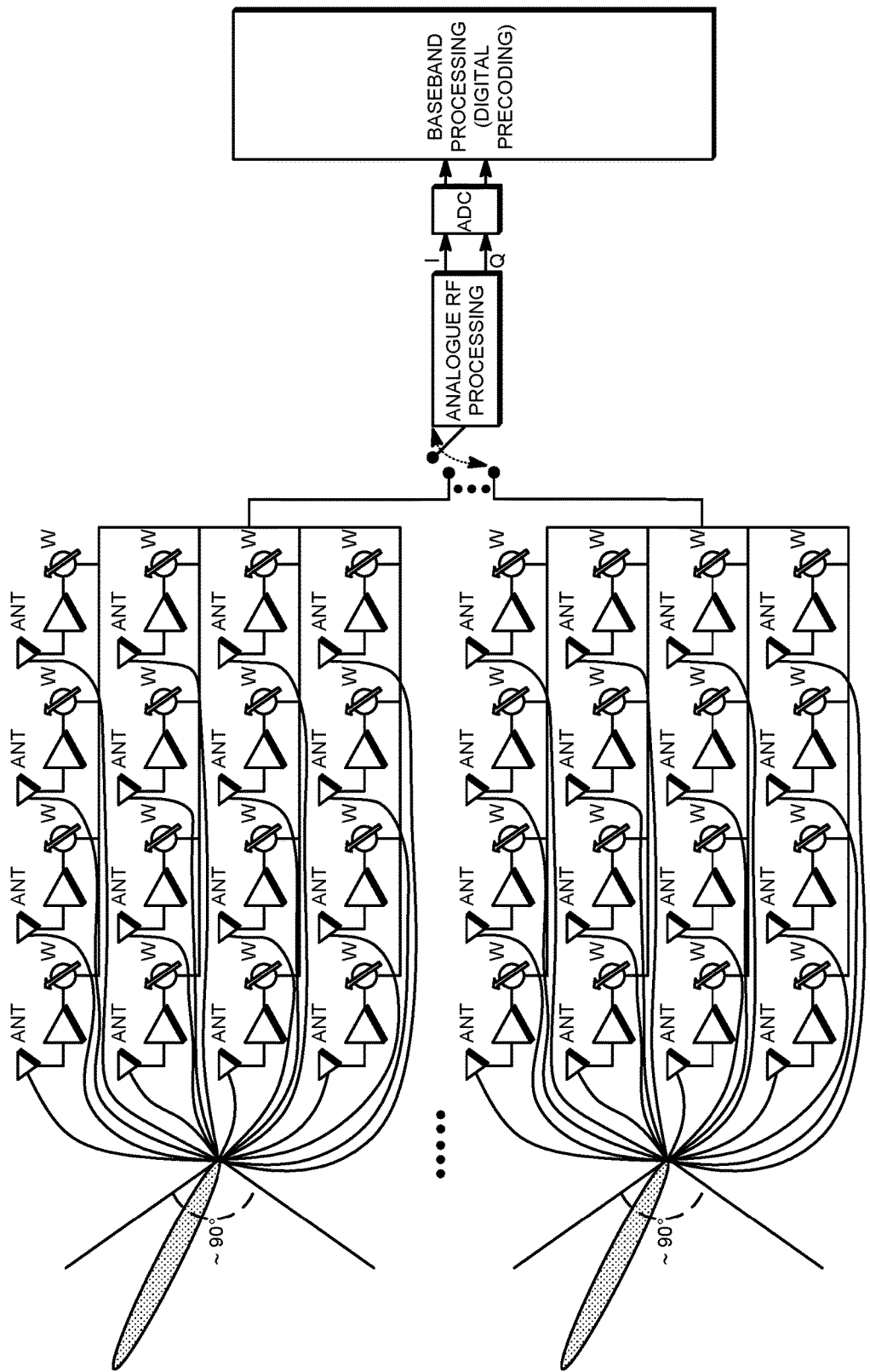
FIG. 10 illustrates an example of mWTRU analog beamforming with two PAAs and one RF chain, for example, using a switch.

In an example with $N_{AE} > N_{PAA} > N_{AP} = N_{TRX}$, multiple PAAs may be connected to an RF chain (e.g. a single RF chain), e.g., by using a switch, as illustrated in FIG. 10. Each of the PAAs may form a narrow beam pattern covering from +45° to −45° in azimuth plane. The narrow beam patterns may be oriented (e.g., oriented separately) so a single-beam solution may provide a good coverage, e.g., by using a narrow beam at different directions at different time instances.

Figure 11:
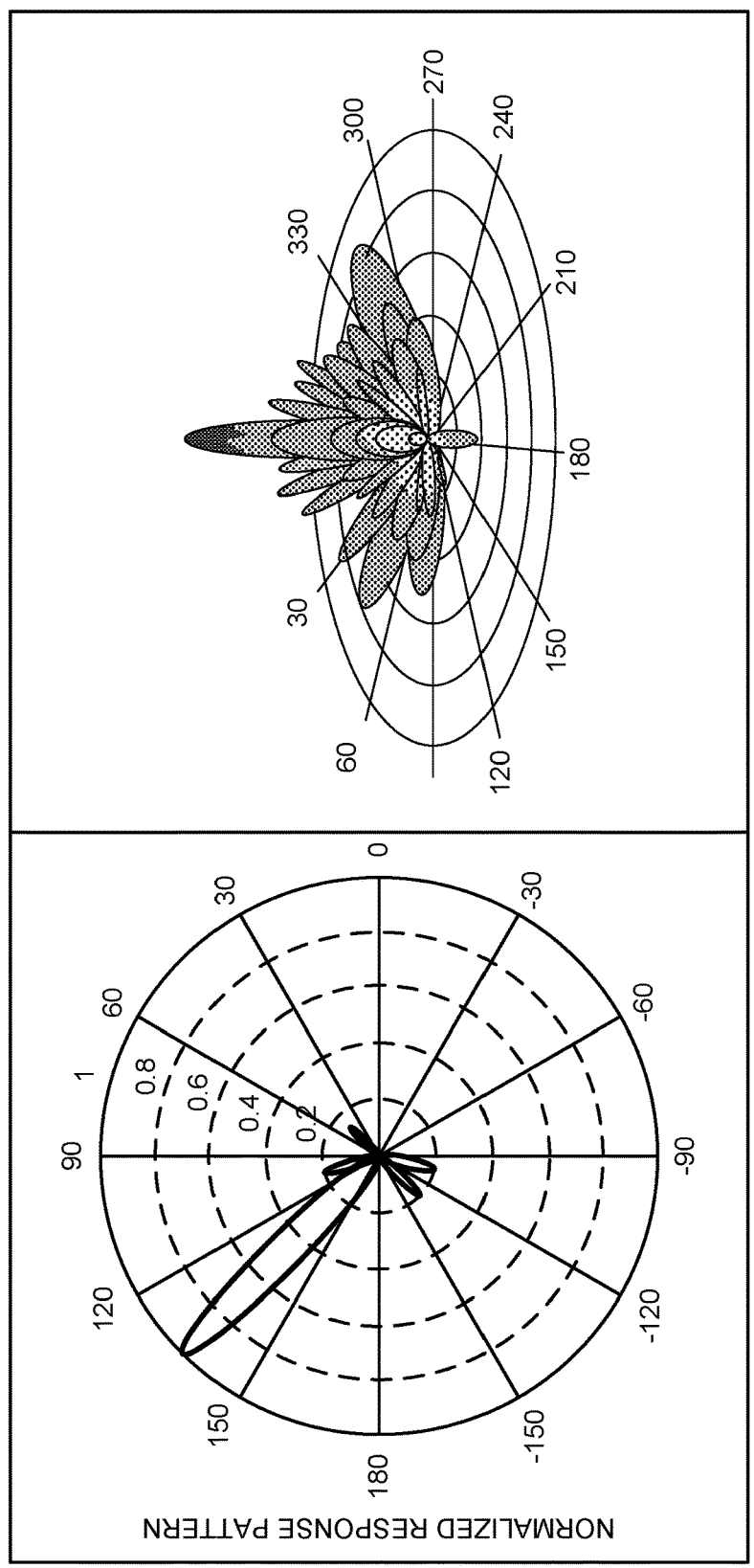
FIG. 11 illustrates exemplary two dimensional (2D) and realistic three dimensional (3D) narrow beam pattern.
Figure 12:
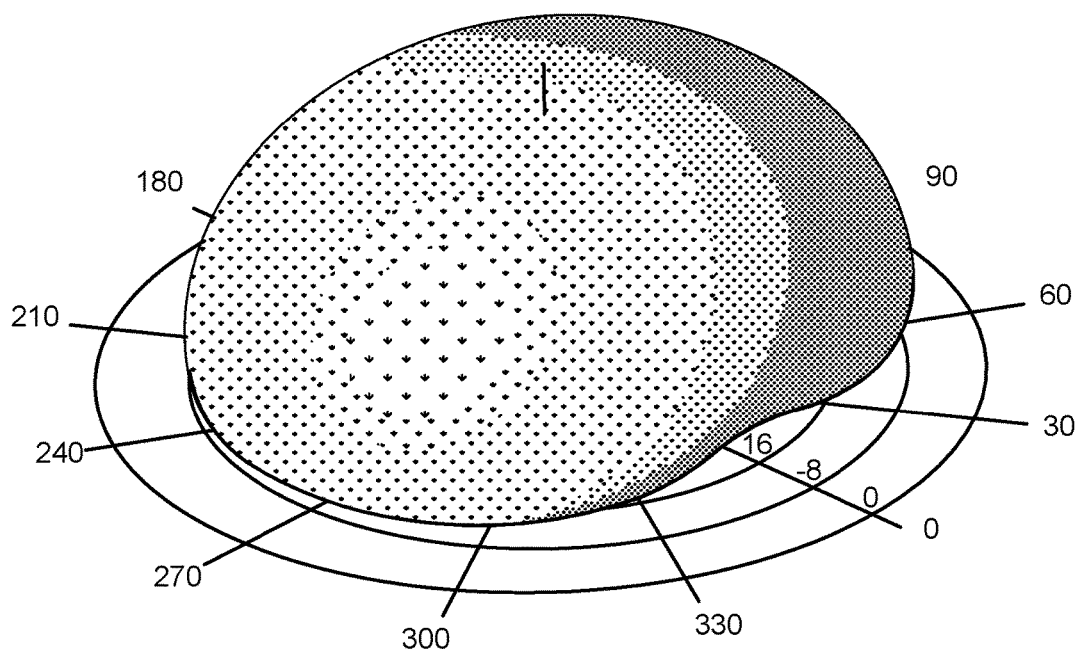
FIG. 12 illustrates an exemplary realistic 3D broadside broad beam pattern.

In an example with $N_{DATA} \leq N_{TR} \leq N_{AE}$, when $N_{DATA} = N_{TRX} = 1$, an mWTRU may have a single-beam configuration and/or may operate one beam at a time. The mWTRU beamforming may form the narrow beam pattern, such as the one shown in FIG. 11, e.g., for a 16×16 PAA at the strongest angular direction, e.g. a line of sight (LOS) path obtained from beam measurement. The mWTRU may form a broad beam pattern (e.g., a wide main lobe), such as the one shown in FIG. 12, e.g., to cover a range of continuous angular directions including both strong and weak angular directions in-between. The antenna gain may be reduced with a broad beam pattern, and the link budget may become worse.

In an example with $N_{DATA} = 1 < N_{TRX}$ (e.g., an when $N_{TPX} = 2$), mWTRU may have one or more (e.g., two) beam patterns (e.g., simultaneous beam patterns) and/or the beam patterns may be different and/or may be used for different applications. The mWTRU may place narrow beam patterns (e.g., two narrow beam patterns) at different angular incoming directions, e.g., to receive one or more (e.g., one) data streams. For example, coherent beam combining may be used to utilize the spatial diversity and/or mitigate the blockage effect and/or weak LOS condition. The mWTRU may form one or more narrow beams and/or one or more broad beams, e.g., for different applications. For example, the narrow beam may be used for data transmission and/or the broad beam may be used for control signaling.

In an example with $1 < N_{DATA} = N_{TRX}$, the transmission may apply MIMO to increase the capacity (e.g., in high SNR channel conditions). The mWTRU may place narrow beam patterns (e.g., two narrow beam patterns) at different angular incoming directions to receive two data streams in parallel.

The SCmB beam forming schemes may include fixed beam, adaptive beam forming (e.g., codebook-based and/or non-codebook-based), and/or classical beam forming (e.g., Direction-of-Arrival (DoA)) estimation. The schemes (e.g., each scheme) may require procedures (e.g., different procedures) and/or work well in scenarios (e.g., certain scenarios). For example, the DoA estimation may require smaller angular spread and/or an mWTRU may transmit an LTE uplink reference signal to provide DoA accuracy. The fixed beam system may have beam cycling and/or switch procedures.

The mWTRU antenna configuration and/or beamforming discussed herein may be based on a single-beam mWTRU antenna configuration, e.g., with analog beamforming, as illustrated in FIG. 7.

A beam may be one of the lobes, e.g., main/side/grating lobes of the transmit radiation pattern and/or receive gain pattern of an antenna array. A beam may denote a spatial direction, for example represented by a set beamforming weights. A beam may be identified and/or associated with one or more of a reference signal, an antenna port, a beam identity (ID), a scrambling sequence number. The beam may be transmitted and/or received at a specific time and/or frequency using a code and/or spatial resources. A beam may be formed digitally, in an analog manner, and/or both (e.g., hybrid beamforming). The analog beamforming may be based on fixed code-book or continuous phase shifting.

A data channel beam may be used to transmit data channel, data channel beam, PDSCH, mPDSCH, mmW PDSCH, mmW data channel, directional PDSCH, beamformed data channel, spatial data channel, data channel slice, and/or high frequency data channel. A data channel beam may be identified and/or associated with a reference signal, an antenna port, a beam identity (ID), a scrambling sequence number, and/or may be transmitted and/or received at a specific time and/or frequency using a code and/or spatial resources.

A control channel beam may be used to transmit control channel, control channel beam, PDCCH, mPDCCH, mmW PDCCH, mmW control channel, directional PDCCH, beamformed control channel, spatial control channel, control channel slice, and/or high frequency control channel. A control channel beam may be identified by and/or associated with one or more of a reference signal, an antenna port, a beam identity (ID), a scrambling sequence number. A control channel beam may be transmitted and/or received at a specific time and/or frequency using a code and/or spatial resources. A control channel beam duration may be a number of OFDM symbols in a TTI occupied by one control channel beam. A control region may be the number of OFDM symbols in a TTI occupied by all the control channel beams transmitted in the TTI (e.g., all the control channel beams transmitted in the TTI).

A measurement beam may be used to transmit a signal and/or channel for beam measurement, e.g., a beam reference signal, a beam measurement reference signal, a common reference signal (CRS), channel state information reference signal (CSI-RS), channel state information interference measurement (CSI-IM), etc. A measurement beam may be identified and/or associated with a reference signal, an antenna port, a beam identity (ID), and/or a scrambling sequence number. A measurement beam may be transmitted and/or received at a specific time and/or frequency using a code and/or spatial resources.

mB, SCmB, eNB, cell, small cell, Pcell, Scell may be used interchangeably. Operate may be used interchangeably, e.g., with transmit and/or receive. Component carrier and/or mmW carrier may be used interchangeably, e.g., with serving cell.

Many of the examples descried herein may be described in terms of downlink operation. However, they may be equally applicable to uplink operation, although the roles of WTRU and eNB may be reversed. Therefore, in the examples described herein eNB and WTRU may be reversed and UL may be substituted for DL and/or vice versa. A channel may refer to a frequency band which may have a center or carrier frequency and/or a bandwidth. Spectrum may include one or more channels which may or may not overlap. Channel, frequency channel, wireless channel, and/or mmW channel may be used interchangeably. Accessing a channel may be the same as using (e.g., transmitting over and/or receiving on) the channel.

A channel may refer to an mmW channel and/or signal, e.g., an uplink channel and/or signal, and a downlink physical channel and/or signal. Downlink channels and signals may include one or more of: a mmW synchronization signal, a mmW broadcast channel, a mmW cell reference signal, a mmW beam reference signal, a mmW beam control channel, a mmW beam data channel, a mmW hybrid ARQ indicator channel, a mmW demodulation reference signal, a primary synchronization signal (PSS), a secondary synchronization signal (SSS), a demodulation reference signal (DMRS), cell-specific reference signal (CRS), channel state information-reference signal (CSI-RS), a physical broadcast channel (PBCH), a physical downlink control channel (PDCCH), a physical hybrid ARQ indicator channel (PHICH), an enhanced physical downlink control channel (EPDCCH), and/or a physical downlink shared channel (PDSCH). Uplink channels and signals may include one or more of mmW physical random access channel (PRACH), mmW control channel, mmW data channel, mmW beam reference signal, mmW demodulation reference signal, PRACH, physical uplink control channel (PUCCH), a sounding reference signal (SRS), a demodulation reference signal (DMRS), and/or a physical uplink shared channel (PUSCH). Channel and/or mmW channel may be used interchangeably. Channels and/or signals may be used interchangeably. PRACH and/or preamble may be used interchangeably.

Data/control may mean data and/or control signals and/or channels. Control may include synchronization. The data/control may be mmW data/control. Data/control and data/control channels and/or signals may be used interchangeably. Channels and/or signals may be used interchangeably. The terms control channel, control channel beam, PDCCH, mPDCCH, mmW PDCCH, mmW control channel, directional PDCCH, beamformed control channel, spatial control channel, control channel slice, and/or high frequency control channel may be used interchangeably. The terms data channel, data channel beam, PDSCH, mPDSCH, mmW PDSCH, mmW data channel, directional PDSCH, beamformed data channel, spatial data channel, data channel slice, and/or high frequency data channel may be used interchangeably.

Channel resources may be the resources (e.g., 3GPP LTE or LTE-A resources) such as time and/or frequency and/or code and/or spatial resources. The channel resources may carry one or more channels and/or signals. Channel resources may be used interchangeably with channels and/or signals.

mmW beam reference signal, mmW reference resource for beam measurement, mmW measurement reference signal, mmW channel state measurement reference signal, mmW demodulation reference signal, mmW sounding reference signal, reference signal, CSI-RS, CRS, DM-RS, DRS, measurement reference signal, reference resource for measurement, CSI-IM, and/or measurement RS may be used interchangeably. mmW cell, mmW small cell, SCell, secondary cell, license-assisted cell, unlicensed cell, and/or LAA cell may be used interchangeably. mmW cell, mmW small cell, PCell, primary cell, LTE cell, and/or licensed cell may be used interchangeably.

Interference and/or interference plus noise may be used interchangeably. A WTRU may determine the UL and/or DL directions of one or more subframes, e.g., according to one or more received and/or configured TDD UL/DL configurations. UL/DL and UL-DL may be used interchangeably. Transmit power, power, and/or antenna array transmit power may be used interchangeably. cmW and/or mmW may be used interchangeably.

The throughput of wireless communication systems has increased significantly, e.g., by new technologies introduced in LTE and Wi-Fi. These technologies may not be sufficient to meet the demands of future applications which, e.g., may require Gbits/sec of throughput and latencies of 1 ms.

One of the components of new radio or the 5G radio access technology (RAT) may be the radio waveform. Orthogonal frequency division multiplexing (OFDM) has been used for LTE and/or Wi-Fi, e.g., due to its simplicity in converting a frequency selective channel into smaller flat fading sub channels (e.g., allowing one-tap equalization per subchannel). Discrete Fourier transformation-spreading-orthogonal frequency division multiplexing (DFT-S-OFDM) may improve the peak average power rate (PAPR) of an OFDM transmission. For example, DFT-S-OFDM may spread the data sequence with DFT before loading the spread signal onto the subchannels.

OFDM and/or DFT-s-OFDM may attach a cyclic prefix (CP) e.g., to prevent the inter-symbol interference (ISI) that may occur due to the channel delay spread, and/or to ensure cyclicity. The length of the cyclic prefix may be fixed and/or dimensioned for the maximum delay spread of the channel. This may result in loss of spectral efficiency when the delay spread of the channel is smaller than the cyclic prefix. The loss may be significant when the variance of the RMS delay spread of the channel is large. For example, in mmWave channels, the delay spread may be below 4 ns for indoor channels in LOS conditions, and up to 70 ns for indoor non-line of sight (NLOS) conditions. Configuring different CP sizes (e.g., many different CP sizes) may not be feasible for a fixed sub-frame duration, e.g., because changing the cyclic prefix size would change the number of OFDM symbols in a subframe. Several waveforms such as zero tail (ZT) DFT-s-OFDM and unique word (UW) OFDM have may be provided, for example, to address the limitation posed by the CP.

ZT DFT-s OFDM may be provided. The zero tail based waveforms may decouple the numerology from the channel characteristics. The zero tail duration may be dynamically adapted to the channel delay spread. For example the zero tail duration may be adapted without changing the OFDM symbol duration. The zero tail may be used as a gap for beam switching, DL/UL switching, and/or interference measurement in mmWave channels.

Figure 13:
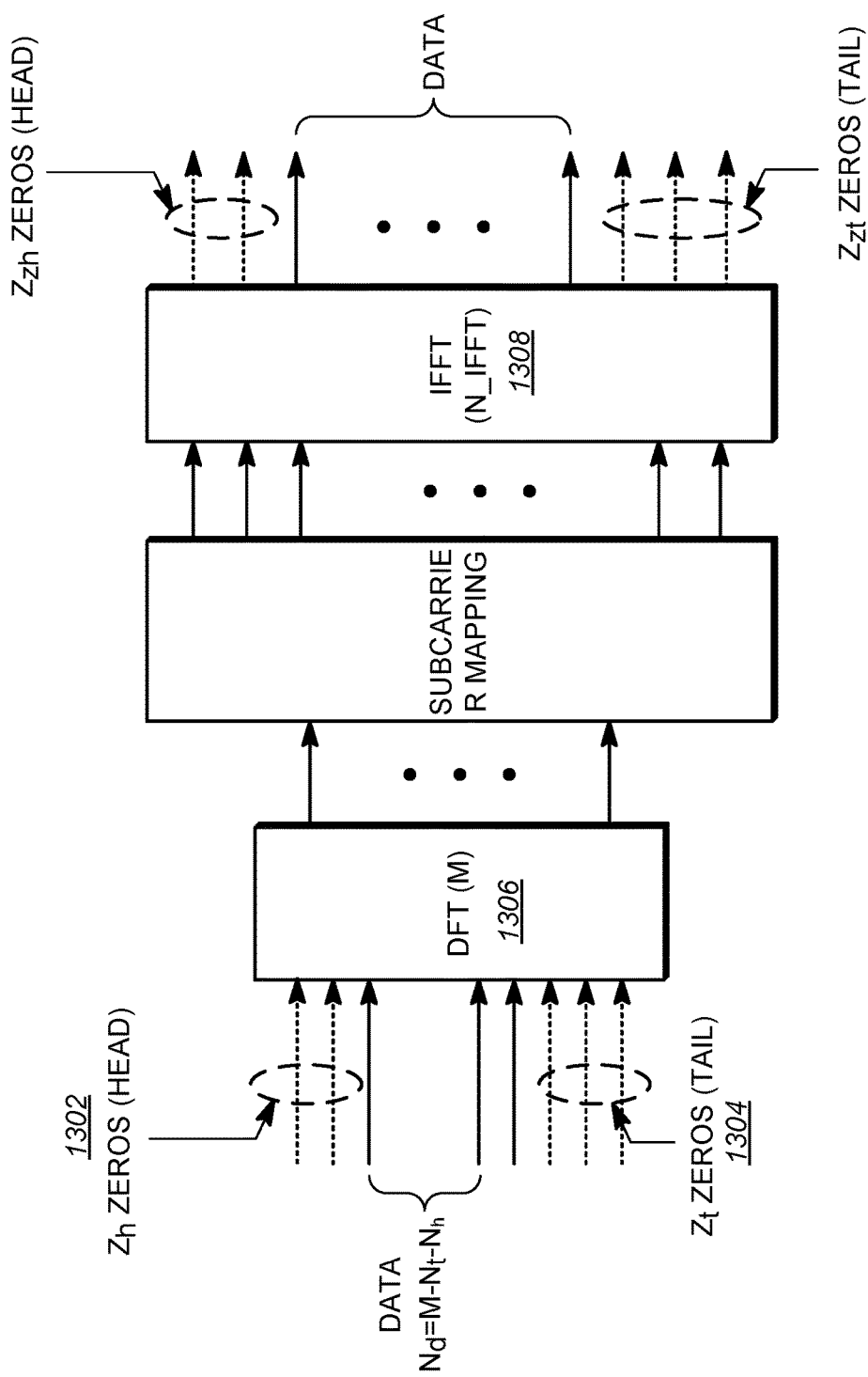
FIG. 13 illustrates an exemplary zero tail discrete Fourier transform-spread-orthogonal frequency-division multiplexing (ZT DFT-s-OFDM) transmitter.

FIG. 13 illustrates an example of a ZT DFT-s-OFDM transmitter. As illustrated in FIG. 13, in ZT DFT-s-OFDM, the zero tail may be generated by feeding zeros to the head 1302 and/or tail 1304 of the DFT spreading block. If the size of the DFT block 1306 is M and the IFFT block 1308 is N IFFT, at the output of the IFFT, there may be the M data symbols and (N_IFFT/M -1) interpolated samples between each data symbol. The zero inputs to the DFT block may be distributed on the head and/or tail of the signal, e.g., at the output of the IFFT. The tail may not become zero (e.g., exactly zero) due to the interpolated samples. The zero tail may be different from one DFT-s symbol to the next, e.g., because the interpolated samples may be data dependent. The cyclic property may not be preserved, which may lead to a bit error floor at high SNR, for example in case of high order modulations.

The shortcomings of the ZT DFT-s OFDM signal may include, e.g., the non-perfect zero tail breaking the cyclic property of the OFDM signal and/or creating ISI. This may result in a BER floor at high SNR, e.g., in high delay spread channels.

A flexible waveform framework may be provided to address the shortcomings of existing ZT waveform, such as elimination of error floor for ZT DFT-s OFDM, improve the BER performance, enable cyclicity of signal, mitigate power spike in the tail, etc., while enabling very low-complexity and low-cost implementation.

Waveform systems may be provided that may change (e.g., dynamically change) the guard interval duration, e.g., to support channel delay spreads (e.g., different channel delay spreads) without changing the numerology, symbol duration, and/or subcarrier spacing. A waveform and/or system may be designed and/or optimized for indoor LOS focus and with additional capabilities, e.g., for NLOS handling and/or outdoor extension. A flexible support for frequency domain scheduling and multi-user multiplexing may be provided. A flexible and/or universal framework may be provided that may support the hybrid-s-OFDM waveforms, e.g., with extension to cover other alternative designs.

Hybrid spread OFDM (hybrid-s-OFDM) waveforms may be provided. Hybrid spread OFDM (hybrid-s-OFDM) waveforms may: reduce the waveform overhead, maintain same numerology (symbol duration, FFT window size, subcarrier spacing), include very low complexity frequency domain equalizer (FDE) with one-tap equalizer, reuse OFDM transmitter and/or receiver structures, improve performance over ZT at higher SNR, energy efficiency, seamless switching between CP and/or ZT waveform configurations, and/or hybrid approach being extendable to other hybrid alternatives (e.g., hybrid of zero padding and/or zero tail). The hybrid approach may be extendable to other hybrid alternatives and/or support low complexity ZT and/or other ZT alternatives.

A waveform system may combine a cyclic prefix (CP) and a low power tail (LPT), where a fixed CP may consist of low power CP (LPCP). The waveform system may utilize a hybrid guard interval (HGI). The HGI may include a fixed short LPCP and/or an adaptive LPT. The adaptive LPT may be used for ISI handling.

A low power cyclic prefix (LPCP) may be generated from low power tail (LPT). The LPT may be generated, e.g., using a zero tail (ZT) technique, or the like. The length of LPT may be at least equal to the delay spread.

Seamless switching between CP and ZT configurations, e.g., with the same numerology and/or same symbol duration may be provided. Waveform systems may be provided to change (e.g., dynamically change) the hybrid guard interval (HGI) to support different channel delay spreads without changing the numerology, symbol duration, and subcarrier spacing. A waveform and/or system may be designed and/or optimized for indoor LOS focus, e.g., using a fixed prefix, suffix, and/or CP, and with additional capabilities for non-line of sight (NLOS) handling and/or outdoor extension, e.g., using adaptive low power tail (LPT).

A cyclic prefix (CP) may be combined with a zero tail (ZT), where a fixed CP may include a zero power CP (e.g., exact zero power CP). The zero power CP may be generated from zero padding (ZP). The ZP may be performed at IFFT output. The ZT may be generated using DFT spreading.

The waveform and/or systems provided may include one or more of the following: The waveform and/or system may enable overhead (e.g., significant overhead) reduction, improved performance, and/or energy efficiency. Waveform overhead reduction may enable a setting (e.g., an aggressive setting) for a fixed CP utilizing a short CP length, for example, optimized for indoor LOS focus. Waveform overhead reduction may enable cyclicity of the signal (e.g., due to use of CP), and may reduce or eliminate zero head to generate low power tail or zero tail (e.g., additional overhead reduction with respect to the use of ZT). Improved performance may enable use of fixed CP at higher SNR to improve performance, and may mitigate power regrowth and/or power spike in the tail, as compared to the ZT solutions. Short CP portion, e.g., with extremely low power may result in energy efficiency.

The waveform solution and/or system may maintain the same numerology of the system and/or may reuse the existing OFDM structure (e.g., the entire existing OFDM structure). The same numerology may be maintained. For example, for different delay spread channels, the same symbol duration, same FFT window size, same subcarrier spacing, etc., may be maintained. An OFDM transmitter and/or receiver structures (off-the-shelf) may be reused. Reusing existing OFDM transmitter and/or receiver structures (off-the-shelf) may result in low development cost, low complexity, faster time to the market, etc.

The waveform solution and/or system may enable seamless configuration switching. Seamless switching between CP and ZT waveforms may be possible, e.g., due to same numerology (same symbol duration, same FFT window size, same subcarrier spacing, etc.) for systems. Configuration switching may be easier.

The solutions provided herein may have advantages over the CP-OFDM, CP-DFT-s-OFDM and ZT DFT-s OFDM waveforms. For example, the hybrid-spread-OFDM (hybrid-s-OFDM) may enable cyclicity of a signal, as compared to ZT DFT-s OFDM. This may improve the performance at high SNR and/or high order modulation. Use of Hybrid-s-OFDM may provide high peak data rates expected for 5G. Hybrid-s-OFDM may mitigate one or more power spikes and/or one or more power regrowths of the tail, e.g., as compared to ZT DFT-s OFDM, resulting in performance improvement. Hybrid-s-OFDM may reduce waveform overhead and/or increase spectrum efficiency, e.g., as compared to conventional CP-OFDM and CP-DFT-s-OFDM. An advantage may include the Hybrid-s-OFDM solution having low complexity for transmitter and/or receiver, e.g., with one-tap frequency domain equalization (FDE).

Figure 14:
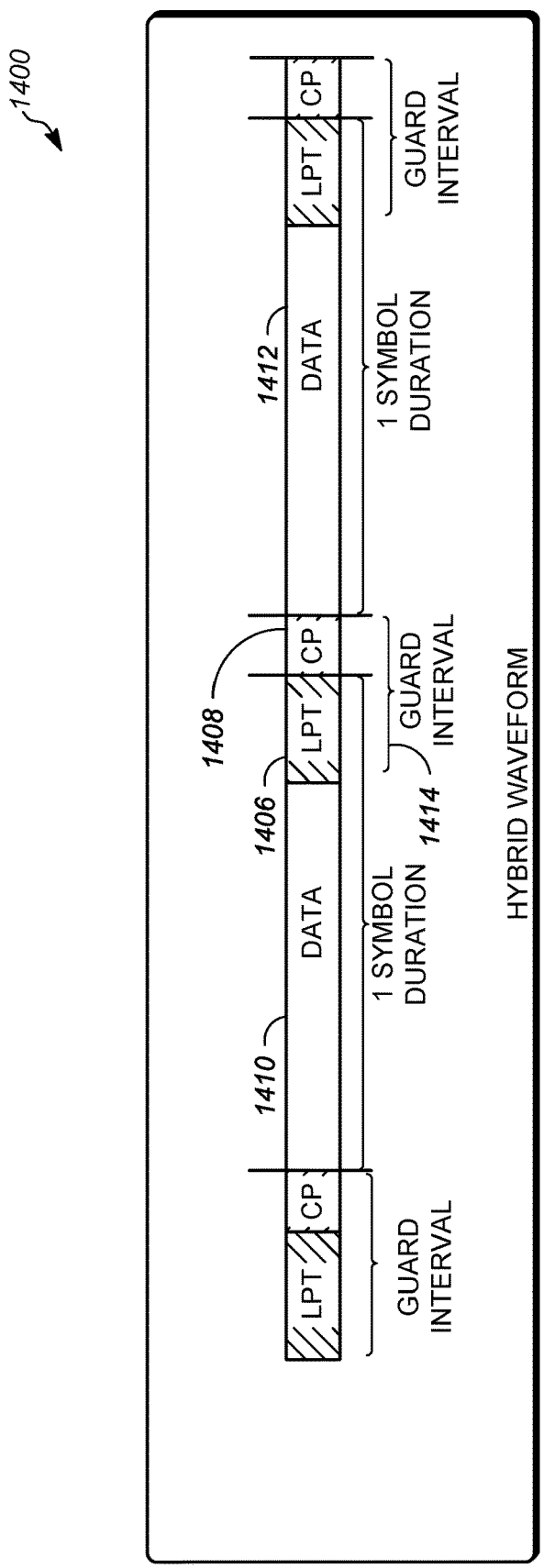
FIG. 14 illustrates an exemplary hybrid-s-OFDM waveform and system with a fixed prefix and adaptive low power tail (LPT).

A hybrid-s-OFDM waveform system may be provided that may combine the conventional fixed waveform (e.g., using a fixed prefix or suffix) with a non-conventional adaptive waveform. Systems, methods, and instrumentalities may be provided to implement low power cyclic prefix (LPCP) and low power tail (LPT). Hybrid-s-OFDM waveform may combine (e.g., intelligently combine) a non-adaptive fixed prefix and/or a suffix, and an adaptive low power tail waveform components. For example, a hybrid-s-OFDM waveform may combine a non-adaptive waveform component (e.g., a CP) and/or an adaptive low power tail (e.g., ZT). The hybrid spread waveform may manage one or more channels by, for example, using a prefix and/or a CP in some cases and/or a LPT in other cases. A fixed prefix, suffix, and/or CP, e.g., may be utilized to handle channel conditions that, for example, are optimized for indoor LOS. Adaptive part of the waveform may be triggered by utilizing an LPT. The utilization of an LPT may be utilized to handle delay spread channels, for example, channels with longer delay spread in an NLOS and/or outdoor channel condition. FIG. 14 illustrates an example of a hybrid spread waveform 1400 utilizing a fixed prefix and adaptive low power tail (LPT).

A prefix may be a CP. A LPT may be generated using ZT technique. Though the hybrid waveform is described herein utilizes a CP and a ZT waveform, those skilled in the art can recognize that other adaptive waveforms may be utilized to generate an LPT. Low power prefix and/or low power CP may be adopted to, e.g., reduce the power consumption of waveform and/or enhance energy efficiency of waveform and/or system. Low power CP may be used to enable cyclicity of signal and/or mitigate the power regrowth of the tail that may occur in the ZT DFT-s OFDM systems.

As illustrated in FIG. 14, LPT 1406 and/or CP 1408 may be placed in front of data 1412. As a result, LPT 1406 and CP 1408 may provide a guard interval (GI) 1414 to the current data symbol 1412 to overcome the ISI from previous data symbol 1410. The GI 1414 may consist of LPT 1406 and/or CP 1408. It may be desirable to have a prefix and/or CP at low power. CP 1408 may be a fixed low power CP (LPCP). LPT may be an adaptive LPT, which may be enabled by ZT, or the like. GI may be a hybrid of a component (e.g., a fixed and/or adaptive component) and may be referred to as hybrid GI (HGI). The HGI may be adaptive to channel delay spread and/or environment. A waveform with a low power CP and/or a low power tail may be provided.

Figure 15:
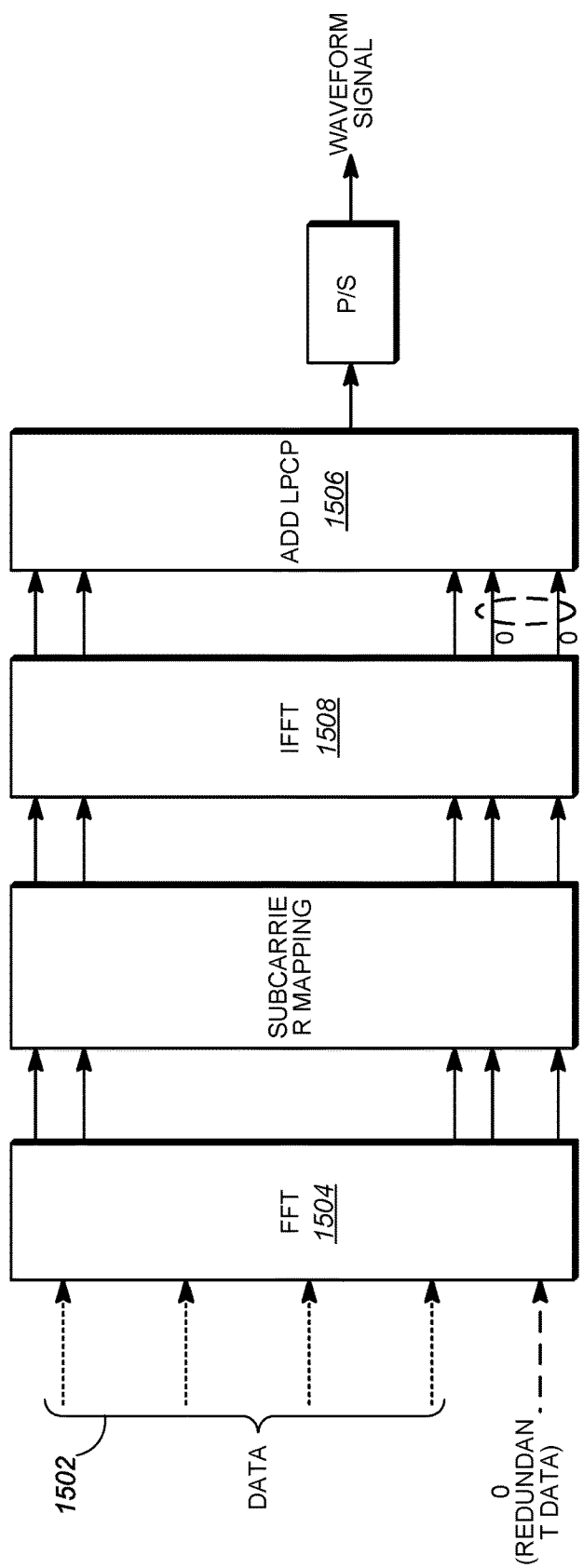
FIG. 15 illustrates an example of hybrid-s-OFDM with low power cyclic prefix (LPCP) and low power tail (LPT) generation using zero tail (ZT).

The hybrid-s-OFDM may utilize DFT and/or FFT spreading for data. FIG. 15 illustrates an example of a hybrid-s-OFDM with LPCP and LPT generation using ZT. As illustrated in FIG. 15, data 1502 may be spread, e.g., using FFT 1504 (or DFT). A LPT may be generated using ZT technique. ZT may be a low complexity technique, e.g., to generate low power tail. In ZT technique, zeros may be inserted in the input of FFT 1504 (and/or DFT). As illustrated in FIG. 15, low power CP (LPCP) may be added by the Add LPCP block 1506. The LPCP may be added to the output of IFFT 1508.

Figure 16:
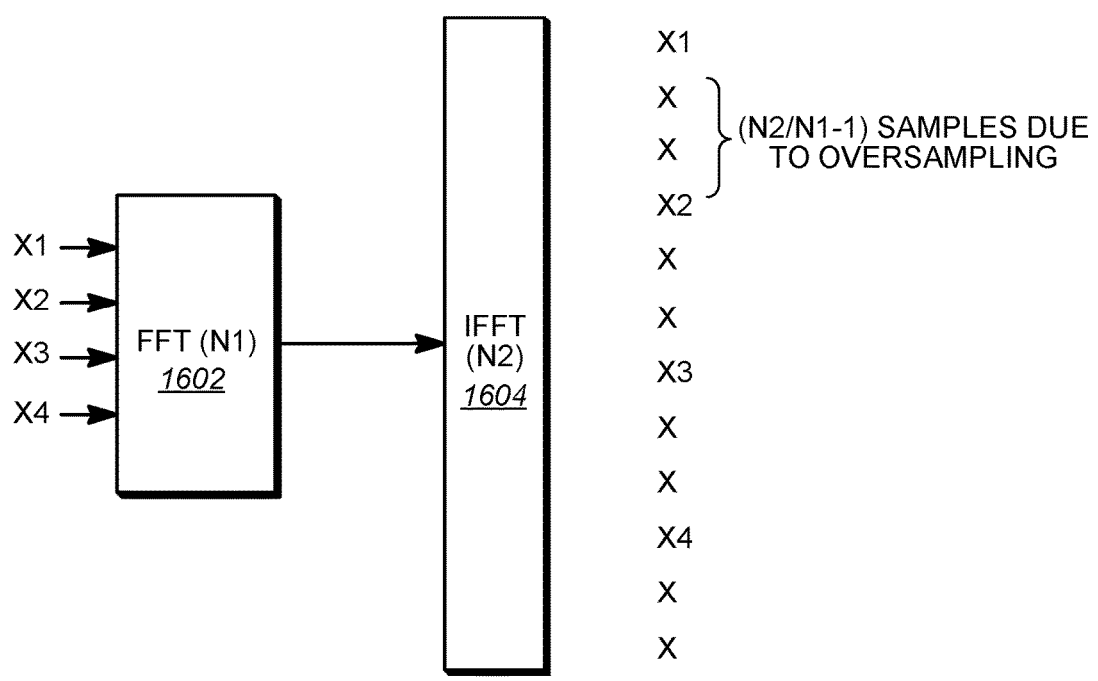
FIG. 16 illustrates an example of zero insertion and interpolation.
Figure 17:
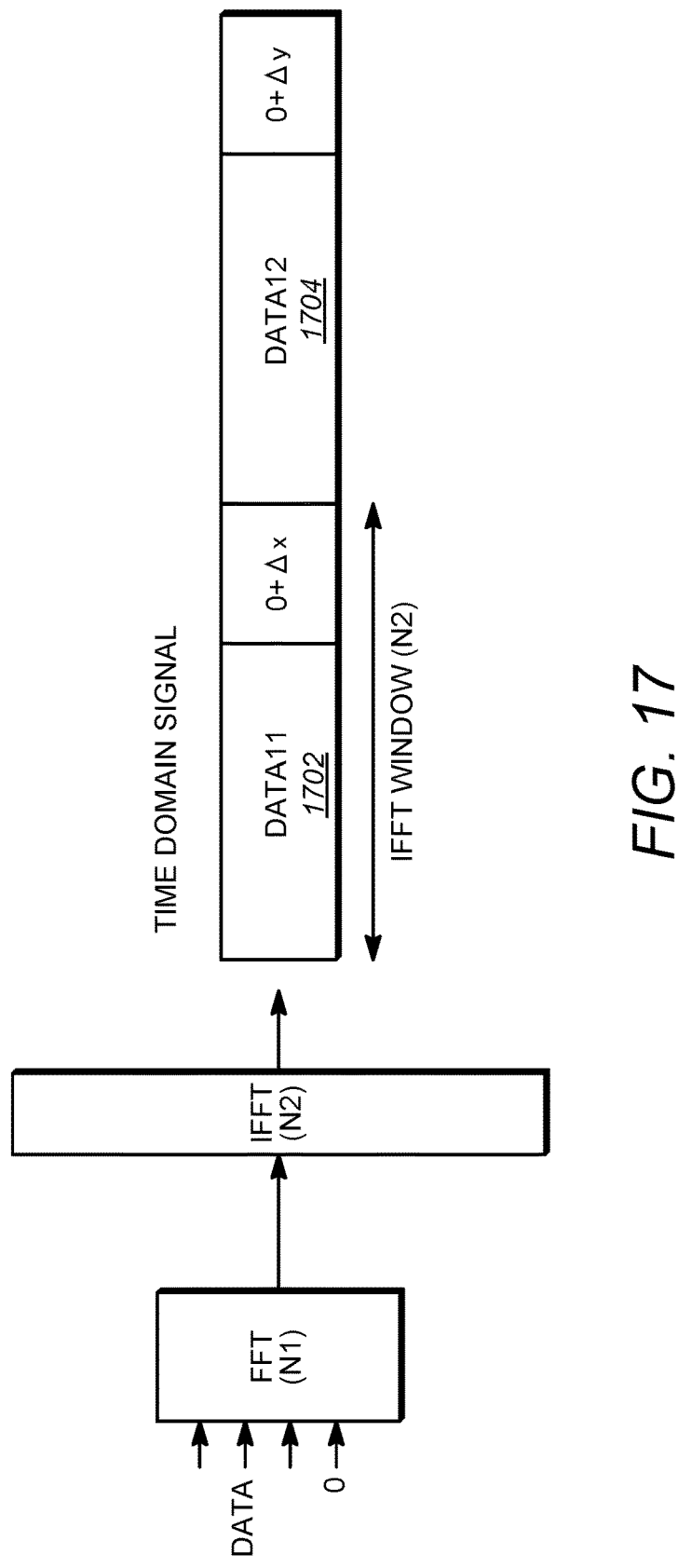
FIG. 17 illustrates an example of loss of cyclicity in ZT.

FIG. 16 illustrates an example of zero insertion and interpolation. As illustrated in FIG. 16, a low power tail may be produced by zero insertion (e.g., at input of an FFT 1602) and/or interpolation (e.g., at output of an IFFT 1604). The low power tail may be produced by using ZT. The use of ZT may result in loss of cyclicity, as illustrated in FIG. 17. This may be because, e.g., $\Delta x \neq \Delta y$ in the tail for two adjacent symbols Data11 1702 and Data12 1704. To enable cyclicity of the signal, $\Delta x$ may be equal to $\Delta y$. Hybrid-s-OFDM waveform may overcome the cyclicity issue, e.g., by utilizing a LPCP generated from $\Delta x$ and $\Delta y$. For data symbol Data11 1702, a LPCP may be generated using $\Delta x$, and for data symbol Data12 1704, a LPCP may be generated using $\Delta y$. As illustrated in FIG. 17, an LPCP may be equal to $\Delta x$ for Data11 and a LPCP may be equal to $\Delta y$ for Data 12. This is further illustrated in FIG. 18.

Figure 18:
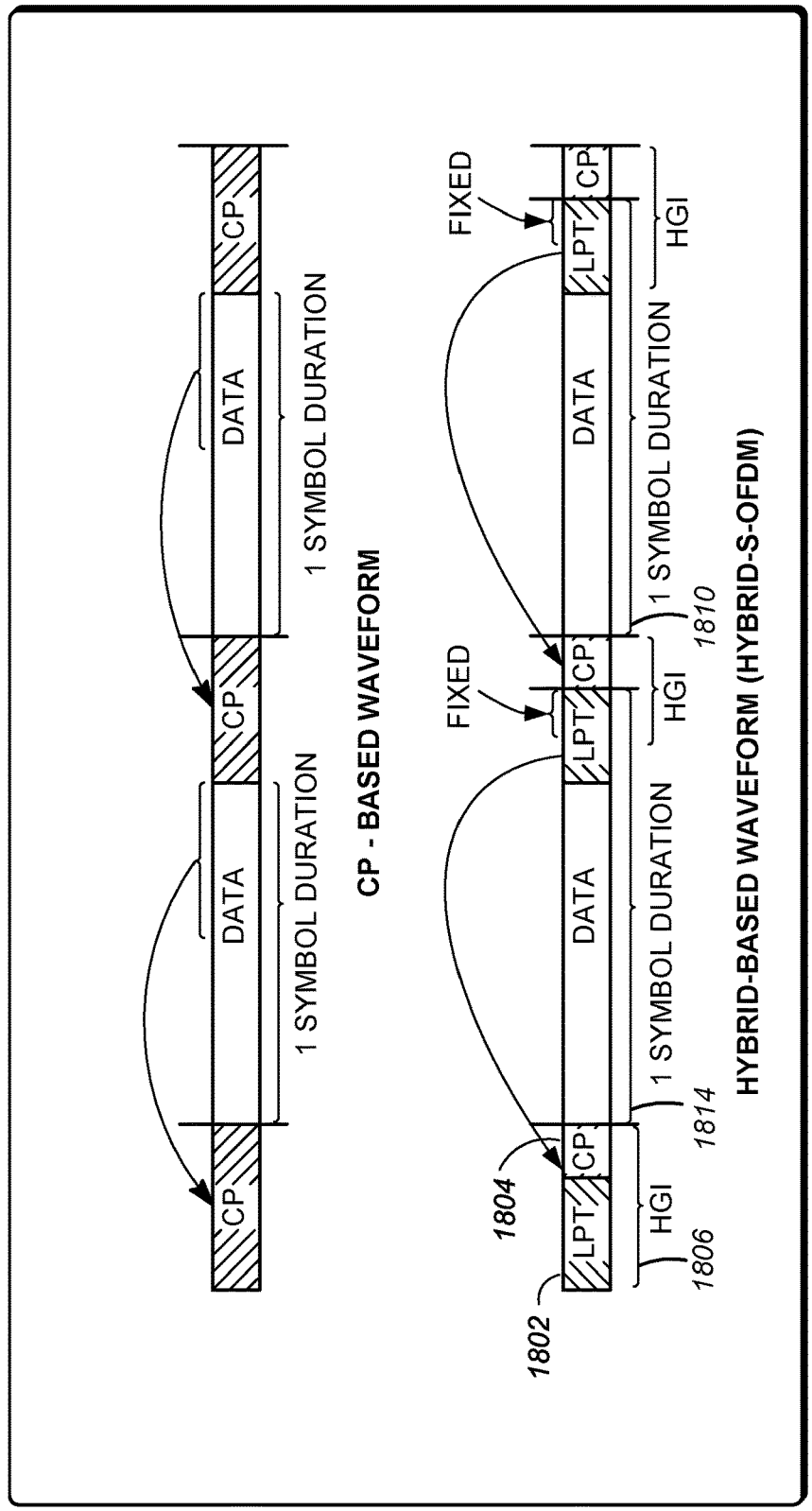
FIG. 18 illustrates an example of a hybrid-s-OFDM based waveform vs. a CP-OFDM based waveform.

A hybrid guard interval (HGI) 1806 may include a fixed CP 1804 (where a CP may be an LPCP) and an adaptive low power tail (LPT) 1802. LPCP 1804 may enable the cyclicity of a signal, e.g., between adjacent symbols 1814 and 1810 for hybrid-s-OFDM. As illustrated in FIG. 18, the hybrid-s-OFDM based waveform may be more efficient, for example, than the fixed CP based waveform. The efficiency may be because the tail length may be adapted (e.g., dynamically adapted) to the channel conditions or the delay spread. A comparison of the fixed-CP based waveform and the HGI-based waveform is illustrated in FIG. 18. If delay spread is small (e.g., such as in a LOS condition), long CP may not be utilized. In hybrid-s-OFDM scheme, the LPT may be shortened and/or the saved resources may be used to carry information (e.g., additional information), e.g., data and/or control information. Because the conventional fixed CP based system cannot adapt to delay spread and/or channel environment, therefore unnecessarily long CP may still be used for short delay spread which results in both overhead inefficiency and energy inefficiency. The fixed CP based system may decrease spectral efficiency.

Figure 19:
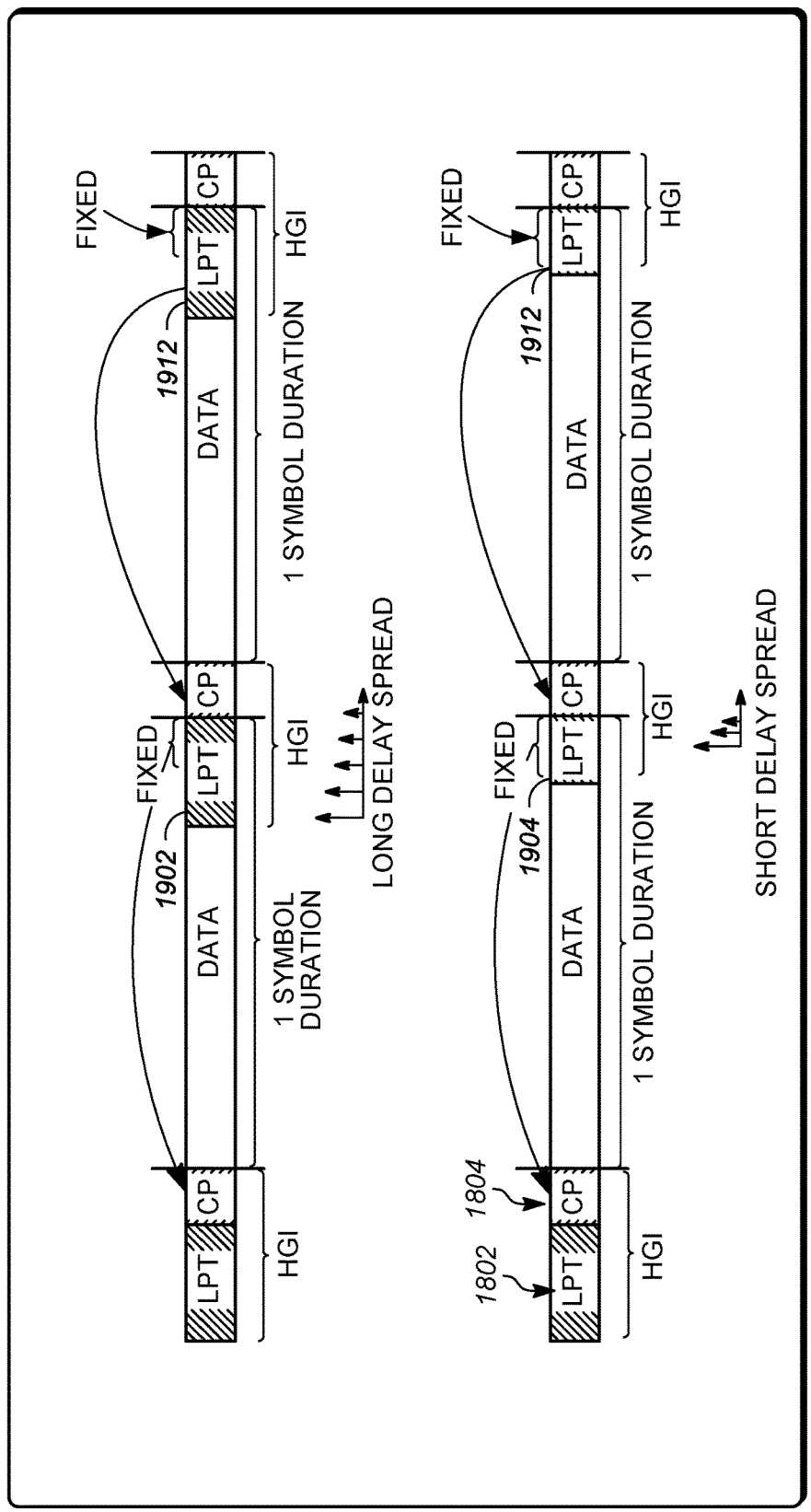
FIG. 19 illustrates an example of hybrid-s-OFDM system maintaining the same numerology for different delay spreads.

FIG. 19 illustrates an example of a hybrid-s-OFDM system maintaining same numerology (e.g., same symbol duration, FFT window size, subcarrier spacing, etc.) for different delay spreads. As illustrated in FIG. 19, a short LPT 1904 may be used, e.g., if delay spread is short (e.g., in a LOS condition). Long LPT 1902 may be used, e.g., if delay spread is long (e.g., in a NLOS condition). LPT may be shortened and/or enlarged (e.g., dynamically shortened and/or enlarged), e.g., to accommodate different delay spreads and/or propagation delays, e.g., based on the changing channel environment. The symbol duration may be maintained, e.g., because LPT may be within FFT and/or IFFT window and/or CP (e.g., LPCP) may be fixed. The saved resources may be used to carry additional information (e.g., data and/or control information), which may be an enhancement to a conventional fixed CP based system.

A control signaling may be used, e.g., to indicate the length of LPT (and/or HGI). Signaling (e.g., explicit signaling) may carry the indicator, e.g., for the number of zeros inserted before FFT (and/or DFT), and/or for the length of LPT (and/or HGI) (e.g., at output of IFFT). Such control signaling may utilize a physical layer (PHY) control channel, MAC, and/or higher layer signaling (e.g., RRC signaling), and/or combinations of physical layer (PHY) control channel, MAC, and/or higher layer signaling (e.g., RRC signaling). Blind detection (e.g., blind energy detection) may be used, e.g., for the detection of zeros at signal constellation level and/or detection for low power tail (LPT) at received signal level. A hybrid signaling scheme may be utilized. Such hybrid signaling scheme may utilize explicit signaling and/or implicit detection method (e.g., energy detection). This may reduce signaling utilized, enhance blind detection performance, and/or reduce complexity of blind detection. For example, explicit signaling may carry information (e.g., rough information) about the number of inserted zeros and/or LPT (HGI) length (e.g., the range of zeros and/or the length) and/or rely on method (e.g., an implicit method, such as blind detection) to further narrow down and/or accurately detect the number (e.g., the exact number) of zeros and/or the length of LPT (and/or HGI).

Systems, methods, and instrumentalities are disclosed for generating low power cyclic prefix (LPCP). Instead of using a CP that may utilize high power similar to data power level, an LPCP may be utilized. The LPCP may reduce energy consumption and/or achieve energy efficient waveform. The LPCP waveform may utilize low (e.g., extremely low) power, e.g., whose power level is below (e.g., significantly well below) the power level of data part (e.g., 15-20 dB or more below the data power level), regardless of the power level of the data part. For example, if Pd represents the data power and Pcp represents the CP power, instead of utilizing a system with Pd=Pcp, an LPCP based system may be provided with Pcp (dB)=Pd (dB)−q, where q may be e.g., 15 to 20 dB or more.

The low power tail (LPT) may be generated by utilizing zero tail technique. The low power CP (LPCP) may be generated from LPT to enable signal cyclicity and mitigate power regrowth. To generate the CP with low power, low power tail may be generated (e.g., generated at the end of IFFT). The length (e.g., proper length) of low power tail, L_LPT, may be determined. The length of low power tail may be at least equal to the length of delay spread, e.g., to achieve optimum performance.

LPT may be generated using ZT. LPCP may be generated using the LPT. LPCP may be designed to enable cyclicity of LPT. LPCP may be designed to mitigate power spike in low power tail. When generating LPT using ZT, LPT may be generated, e.g., without using zero head. LPT may be generated using delay spread as input and LPCP as threshold.

Low power CP (LPCP) may be generated as follows. Low power CP (LPCP) may be generated by determining the length of LPCP, L_LPCP. L_LPCP may consider delay spread and/or power regrowth. L_LPCP may be determined based on the length of majority delay spread and/or power regrowth. LPCP may be fixed throughout the system, e.g., once LPCP length is determined. L_LPCP may be equal to max (Ld, Lp), where Ld may be the length of majority delay spread, and Lp may be the length of power regrowth. Ld may be greater than Lp. In an example design L_LPCP may be equal to, but not limited to Ld.

Low power tail (LPT) may be generated, e.g., once L_LPCP is determined. L_LPT may be a function of delay spread and L_LPCP (L_LPT=f (delay spread, L_LPCP). LPT may be generated, e.g., based on a delay spread, using LPCP length as a threshold.

Figures 3, 20:
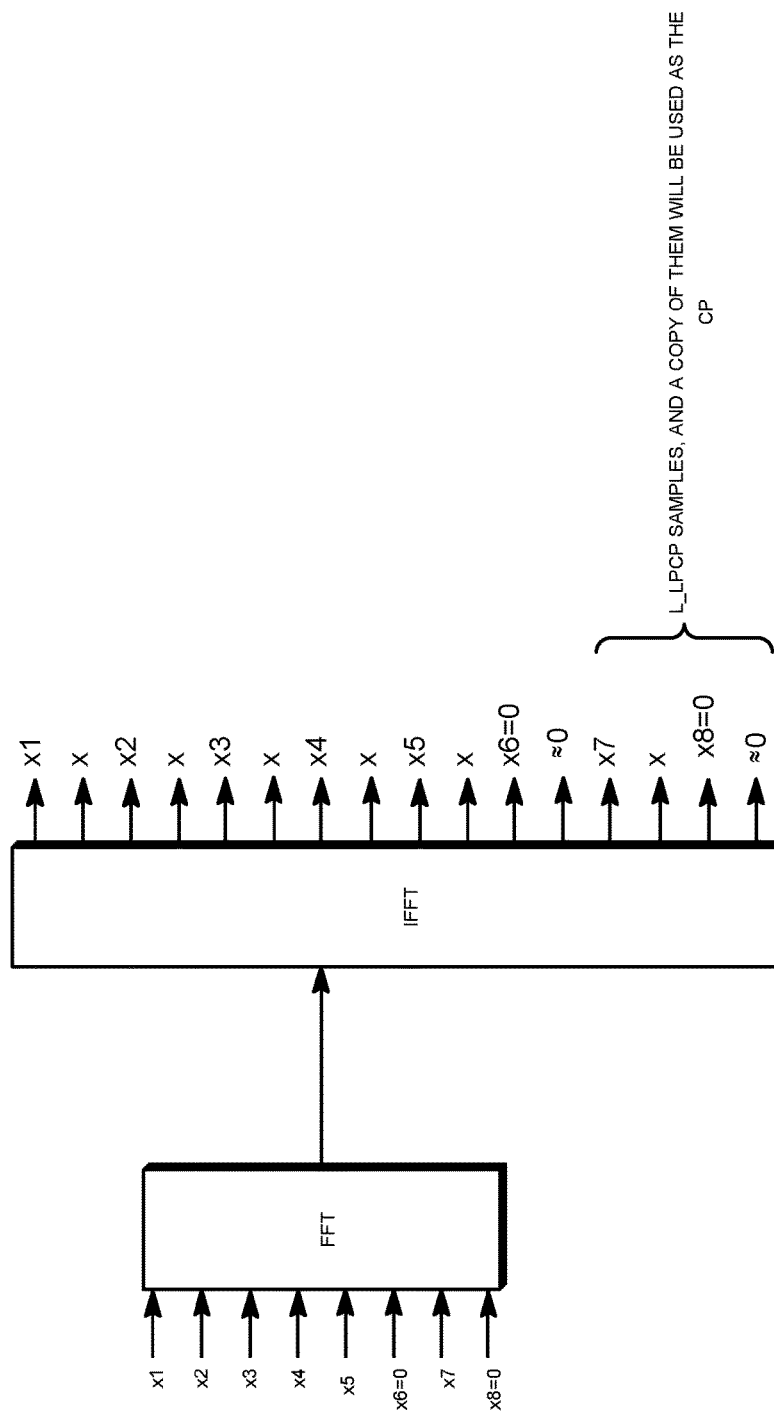

An LPT may be generated with length equal to the length of delay spread, e.g., if the delay spread>L_LPCP. No additional low power tail may be generated, if the delay spread<LPCP length. An LPT may not be generated, e.g., if delay spread<=L_LPCP. An LPT may be generated with length of delay spread, e.g., if delay spread>L_LPCP. When the delay spread>L_LPCP, a two-zero-fragment approach may be used for enhanced spectral efficiency. An example symbol structure is illustrated in the FIG. 20-1. As illustrated in FIG. 20-1, the data in the DFT window may have two parts: Data 1 2002 and Data 2 2004. There may be two fragments of zeros 2006 and 2008 around Data 2. Each zero fragment may have length equal to (delay spread)−L_LPCP. The spectral efficiency may be enhanced, e.g., because Data 2 2004 may carry data instead of zeros. If the delay spread≤L_LPCP, no LPT may be generated. If the delay spread>L_LPCP, two zero fragments may be generated.

FIG. 20-2 illustrates an example of a sequence of symbols. FIG. 20-2 illustrates a symbol structure of two fragments of zeros that may enable signal cyclicity. The signal cyclicity may be main maintained, for example, if delay spread is greater than CP (or LPCP). To generate two fragments of zeros (e.g., approximately zeros) in time domain in the OFDM signal, one or more samples input to the FFT (and/or DFT) module may be set (e.g. selectively set) to zero, as described herein.

FIG. 20-3 illustrates an example of creating two fragments of zeros. The two zero segments may be close to, but not exactly zeros, e.g., due to the interpolation nature in the output of the IFFT module. When generating LPT using ZT, e.g., the LPT length may be determined (e.g., determined first). When generating LPT using ZT, e.g., N_t may be determined (e.g., determined next). LPT length may be related to N_t by L_LPT=floor((IFFF_size×N_t)/DFT_size), where N t may be the number of zeros inserted at input of DFT (or FFT) spreading block.

The low power CP (LPCP) waveform (e.g., the final low power CP (LPCP) waveform) may be generated. LPT may be generated at the output of IFFT. LPCP may be generated, e.g., by taking the last L_LPCP portion of LPT, e.g., the last L_LPCP portion of LPT that is equal to the length of LPCP. The LPT copy (e.g., the LPT copy having LPCP length) may be inserted to the front of waveform before data. Transmit LPCP and data with LPT (e.g., both LPCP and data with LPT). The HGI length (e.g., total HGI length) may be equal to LPCP length+LPT length.

Figure 21:
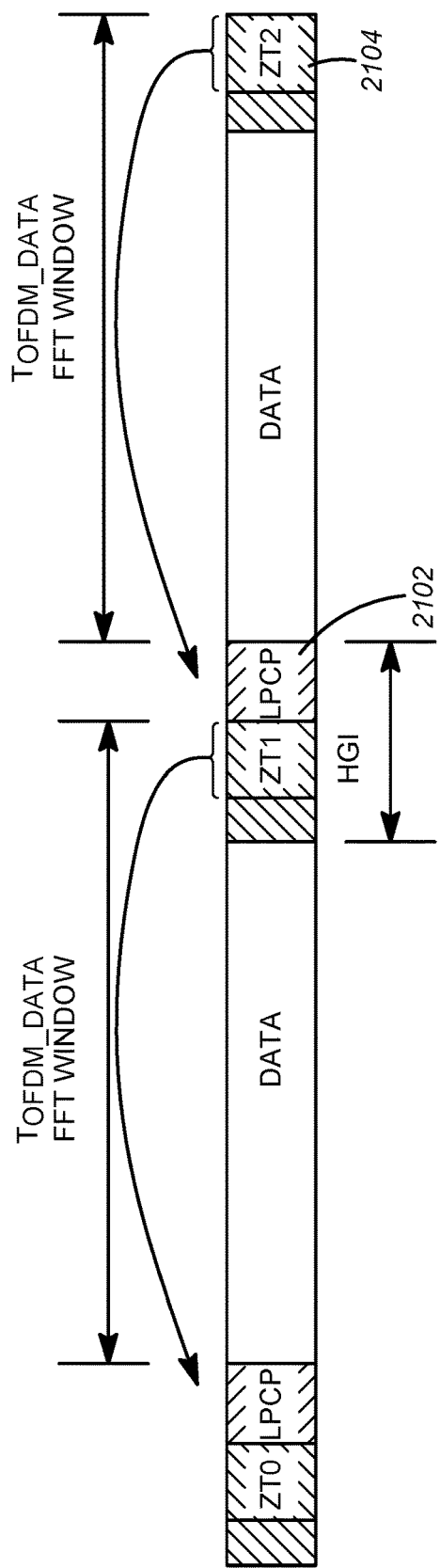
FIG. 21 illustrates an example of low power CP generation for a hybrid-s-OFDM system.

Hybrid-s-OFDM may include LPCP. The LPCP may be generated using one or more ZT techniques. FIG. 21 illustrates an example of low power CP waveform generation for a hybrid-s-OFDM based system. As illustrated in FIG. 21, the LPCP 2102 may be generated from LPT 2104, e.g., using ZT technique. The size M vector at the input of the FFT (or DFT) may be expressed as:

$$x = \begin{bmatrix} d_{N_h \times 1} \\ d \\ 0_{N_t \times 1} \end{bmatrix}$$

where $d \in \mathbb{C}^{(M-N_h-N_t) \times 1}$ may be a vector of complex data modulation symbols. $d_{N_h \times 1}$ may be a vector of size $N_h \times 1$ which may carry zeros and/or data.

Figure 22:
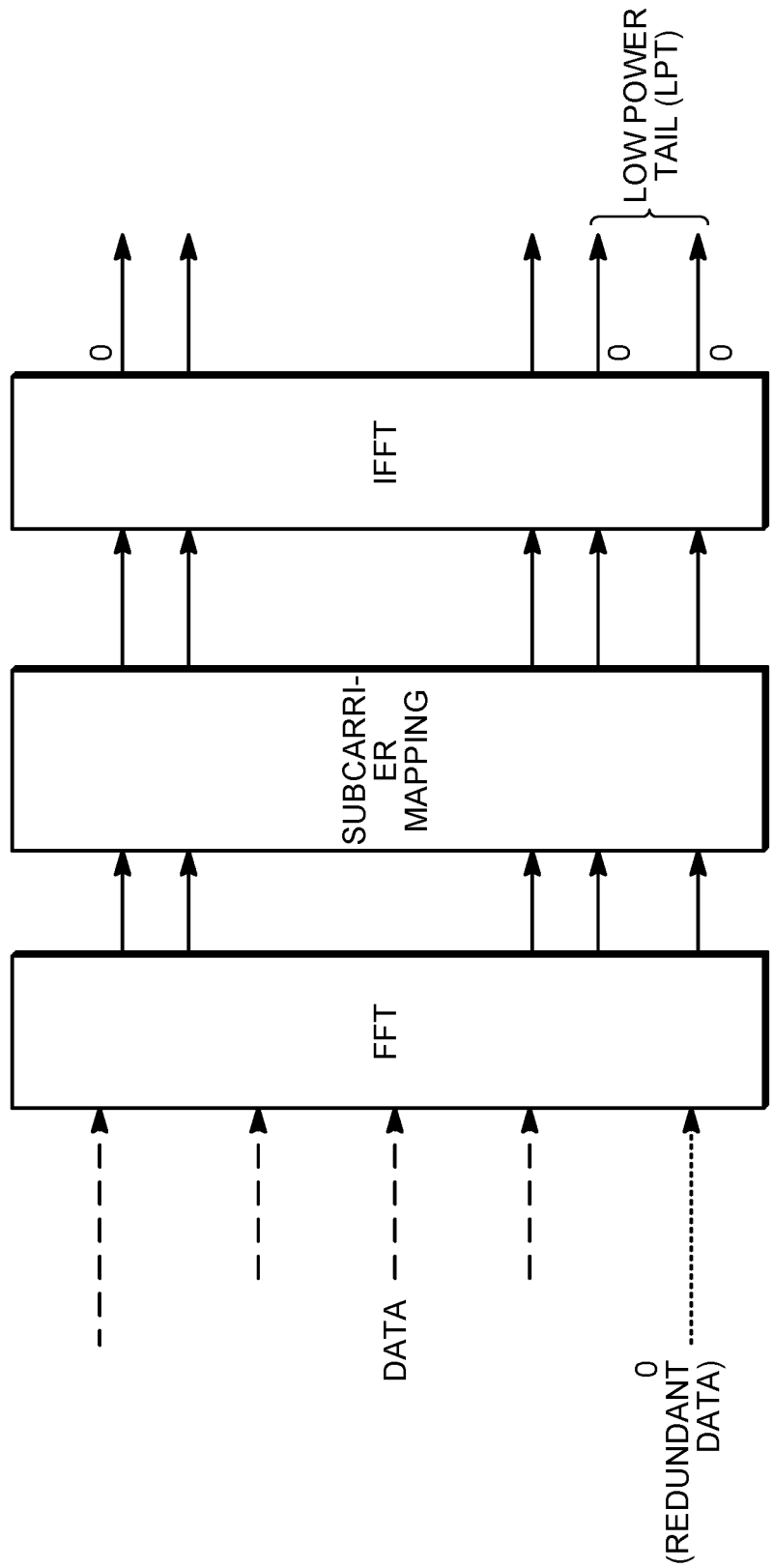
FIG. 22 illustrates an example of low power tail (LPT) generation using ZT technique for hybrid-s-OFDM system.
Figure 23:
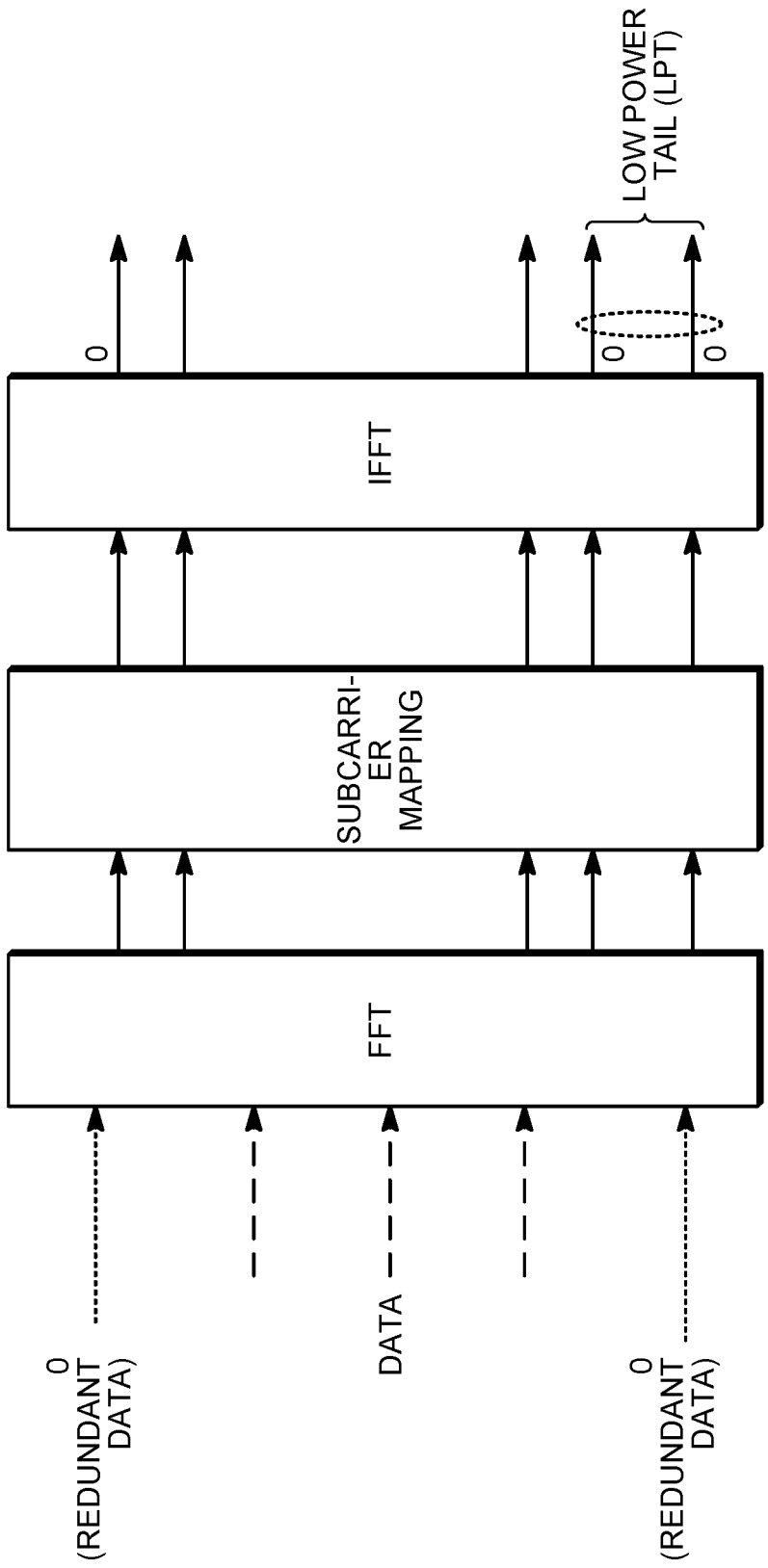
FIG. 23 illustrates an example of low power tail (LPT) generation using ZT technique for hybrid-s-OFDM system.

FIGS. 22 and 23 illustrate examples of low power tail (LPT) generation using ZT technique in hybrid-s-OFDM systems. As illustrated in FIG. 22, $d_{N_h \times 1}$ may carry data. In FIG. 23, $d_{N_h \times 1}$ may carry zeros. Since one or more of the designs may not need $d_{N_h \times 1}$ to carry zeros, $d_{N_h \times 1}$ may be used to carry data (e.g., which may reduce waveform overhead and/or enhance spectrum efficiency). For example, $d_{N_h \times 1}$ may be used to carry certain control information (e.g., waveform configuration switch indicator (Switch_IND)) as described herein. $y_d = [y_0 \ y_1 \ \ldots \ y_{N-L} u_0 \ u_1 \ \ldots \ u_{L-1}]^T$ and $y_d \in \mathbb{C}^{N \times 1}$ may be the vector at the N-size IFFT output, where $u_d = [u_0 \ u_1 \ \ldots \ u_{L-1}]^T$ may be the vector of low power tail (LPT) of length L. L may be equal to L_LPT.

The signal $y_d$ at the output of the N-size IFFT may be written as:

$$y_d = F_N^H P_d F_M x$$

where $F_N$ and $F_M$ may be the FFT (and/or DFT) matrix of size N and M, respectively, and $P_d$ may be the matrix operation for subcarrier mapping. The hybrid-s-OFDM signal $z_d$ with LPCP may be written as:

$$z_d = V_{LPCP} F_N^H P_d F_M$$

where $V_{LPCP}$ may be a matrix operation for LPCP generation and addition.

Figure 24:
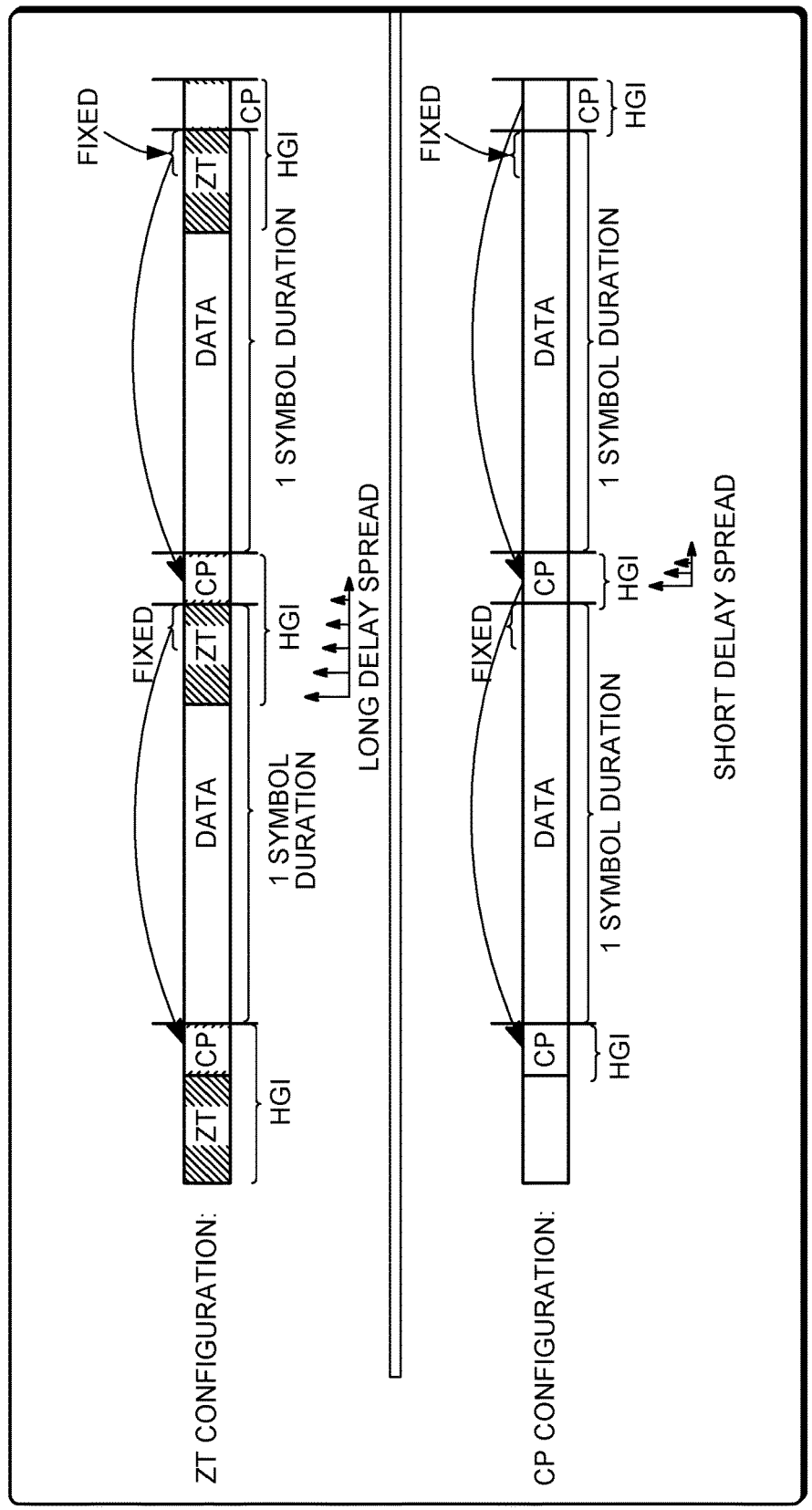
FIG. 24 illustrates an example of configuration switching with hybrid-s-OFDM system.

Systems, methods, and instrumentalities are disclosed to implement switching (e.g., seamlessly switching) between fixed CP waveform and/or adaptive ZT waveform by enabling cyclicity. FIG. 24 illustrates an example of configuration switching in a hybrid-s-OFDM system. As illustrated in FIG. 24, a LPT may utilize a ZT, and CP may be a LPCP. Dynamic switching between CP and ZT may be performed. The CP and ZT configurations may be switched seamlessly. The system may switch to CP-based waveform (CP configuration), for example, when the system is in a LOS condition. The system may switch to ZT-based waveform (ZT configuration), for example, when the system is in an NLOS condition.

A switch indicator (e.g., Switch_IND) may be sent from eNodeB (eNB), an access point (AP) and/or a network to a user. The switch indicator may indicate to the user switch the configuration. The configuration switching may not change numerology, e.g., symbol duration, FFT window size, subcarrier spacing, and/or any other system parameters. Switching may be performed dynamically, e.g., using a fast control channel, either a layer one control or MAC, and/or semi-statically using higher layer signaling. Upon receiving the control signaling that carries switch indicator Switch_IND at receiver, the user may decode the control channel, obtain the Switch_IND. The user may switch to the proper configuration according to the content of Switch_IND. For example, if Switch_IND=CP, the user may indicate the physical layer to use CP waveform configuration. If Switch_IND=ZT, the user may indicate the physical layer to use ZT waveform configuration. Configuration switching between CP and ZT may be made seamlessly, e.g., without changing subframe structures.

Seamless switching may increase system flexibility. Seamless switching may make resource scheduling more efficient. The switching may be performed on per-user basis, per TTI-basis, and/or a combination of per-user basis and per TTI-basis. For example, in a case of per-user based basis, one user may be configured for and operating on CP configuration and another user may be configured for and operating on ZT configuration.

In case of per-TTI basis, configurations may be dynamically switched between CP and ZT. For example, CP may be configured and/or used in TTI#x. ZT may be configured and/or used in TTI#y.

Different user groups may be configured and/or operating in different configurations, e.g., when applying to a per-user group basis. The users in a group (e.g., the same group) may use and/or operate in the same configuration. For example, WTRU group A may be configured and/or operating with ZT, while WTRU group B may be configured and/or operating with CP.

Different beams may be configured and/or operating in different configurations, e.g., when applying to per-beam basis for beamforming system. Users in the same beam may use and/or operate in the same configuration. For example, beam #1 may be configured and/or operating with ZT, while beam #2 may be configured and operating with CP. Although methods are illustrated using some specific examples and scenarios, combinations (e.g., any combination) of per-user, per-TTI, per-user group, per-beam methods, etc., may be possible.

Figure 25:
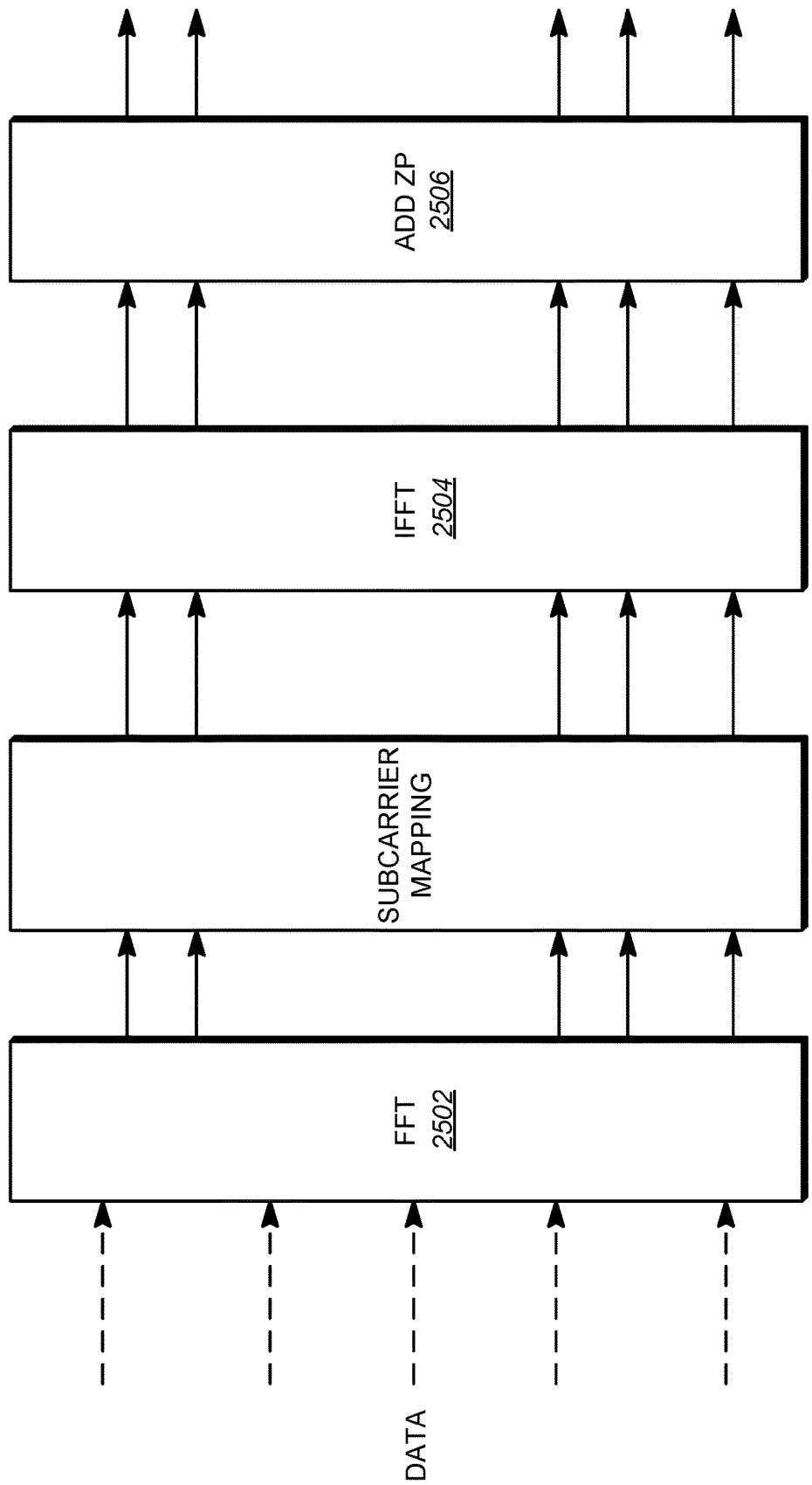
FIG. 25 illustrates an example of zero padding (ZP) DFT-s-OFDM.

A Hybrid-s-OFDM system using zero padding may be provided. A hybrid-s-OFDM waveform may utilize zero padding (ZP) technique. FIG. 25 illustrates an example of ZP DFT-s-OFDM. As illustrated in FIG. 25, data may be spread using FFT 2502 (and/or DFT), for example, before the input of IFFT 2504. ZP 2506 may be added to the output of IFFT 2504.

Figure 26:
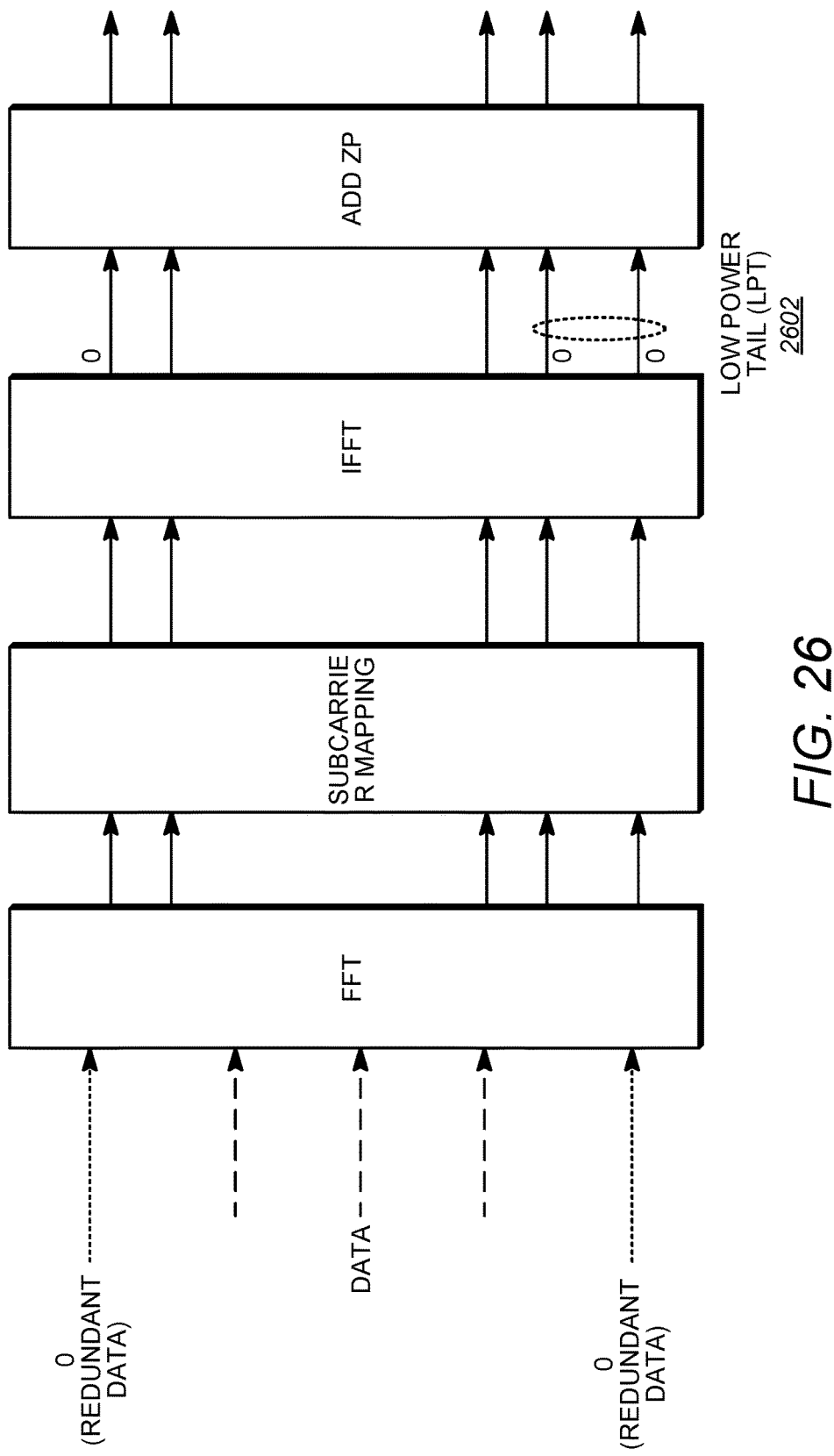
FIG. 26 illustrates an example of hybrid-s-OFDM using a zero padding (ZP).

A hybrid-s-OFDM waveform may utilize a zero padding (ZP), e.g., with low power tail (LPT). As illustrated in FIG. 26, an LPT 2602 may be generated using ZT, and ZP may be added and attached to LPT. ZP may be attached to LPT, for example, when LPT is generated. ZP may be concatenated with LPT.

Figure 27:
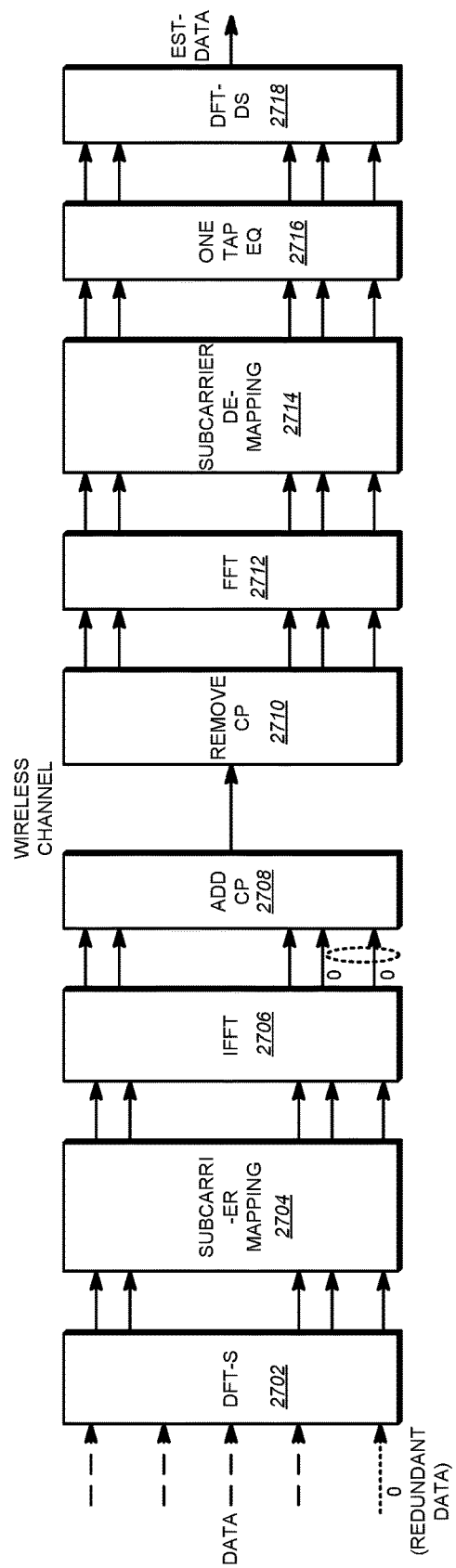
FIG. 27 illustrates an example of a hybrid-s-OFDM transmitter and a hybrid-s-OFDM receiver.

FIG. 27 illustrates an example of a hybrid-s-OFDM based transmitter and receiver. A hybrid-s-OFDM transmitter and receiver system may reuse the OFDM transmitter and receiver design. A hybrid-s-OFDM transmitter may include one or more of the following: DFT-S module 2702, subcarrier mapping module 2704, IFFT module 2706, CP add module 2708. A hybrid-s-OFDM receiver may include one or more of the following: CP remove module 2710, FFT, 2712, subcarrier de-mapping module 2714, one tap equalizer 2716, and DFT-DS module 2718. For example, a hybrid-s-OFDM transmitter may use DFT-S module 2702 to spread the transmitted signal or data including zeros and convert them to frequency domain, use subcarrier mapping module 2704 to map spread signal or data to subcarriers in frequency domain, use IFFT module 2706 to convert frequency-domain signal or data to time-domain signal or data and generate LPT, and use CP add module 2708 to add or attach LPCP to the resulting time-domain signal or data.

A hybrid-s-OFDM receiver may use CP remove module 2710 to remove LPCP from the received time-domain signal or data, use FFT 2712 to convert time-domain signal or data to frequency domain signal or data, use subcarrier de-mapping module 2714 to de-map the subcarriers to obtain the corresponding signal or data in subcarriers, use one tap equalizer 2716 to equalize the corresponding signal or data, and use DFT-DS module 2718 to de-spread the signal or data and convert the frequency-domain signal or data to time-domain signal or data.

Hybrid-s-OFDM may have a low complexity transmitter and receiver, e.g., with one-tap equalizer. A low complexity receiver using FDE with one-tap equalizer may be expressed as:

$$x_{est} = (H^H H + \sigma^2 I)^{-1} H^H r$$

where r may be the received signal and H may be the channel matrix.

Figure 28:
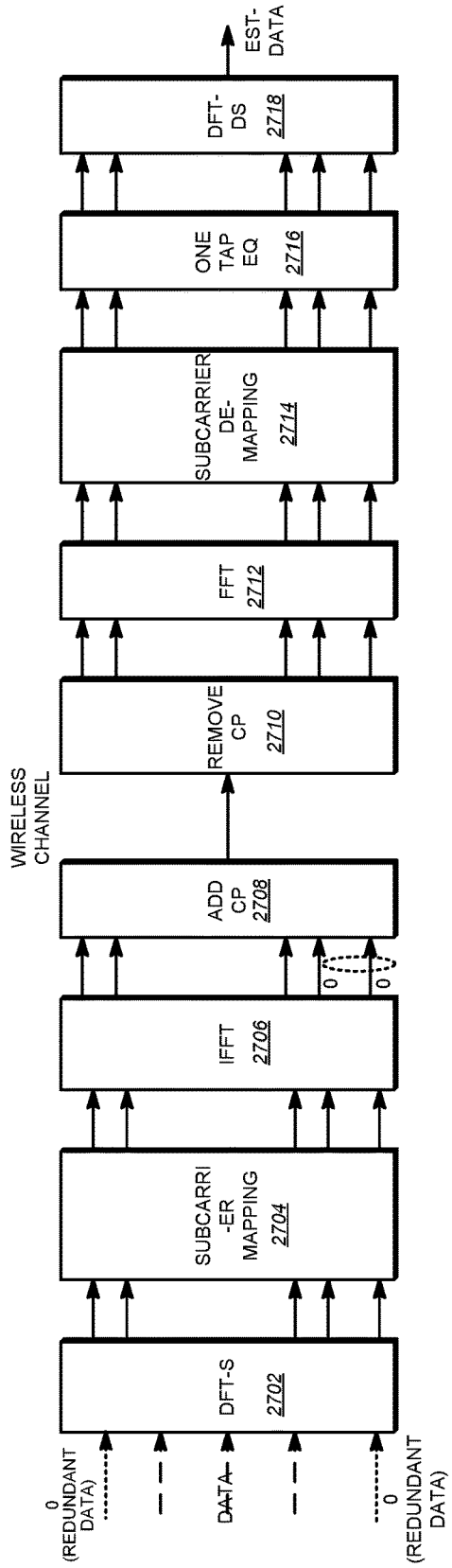
FIG. 28 illustrates an example of a hybrid-s-OFDM transmitter and a hybrid-s-OFDM receiver with additional zeros inserted on top of DTF-S.

As illustrated in FIG. 28, additional zeros may be inserted on top of input of DFT-s 2802. For example, some zeros may be added to the first part of DFT-s input, followed by data which is again followed by some zeros.

Figure 29:
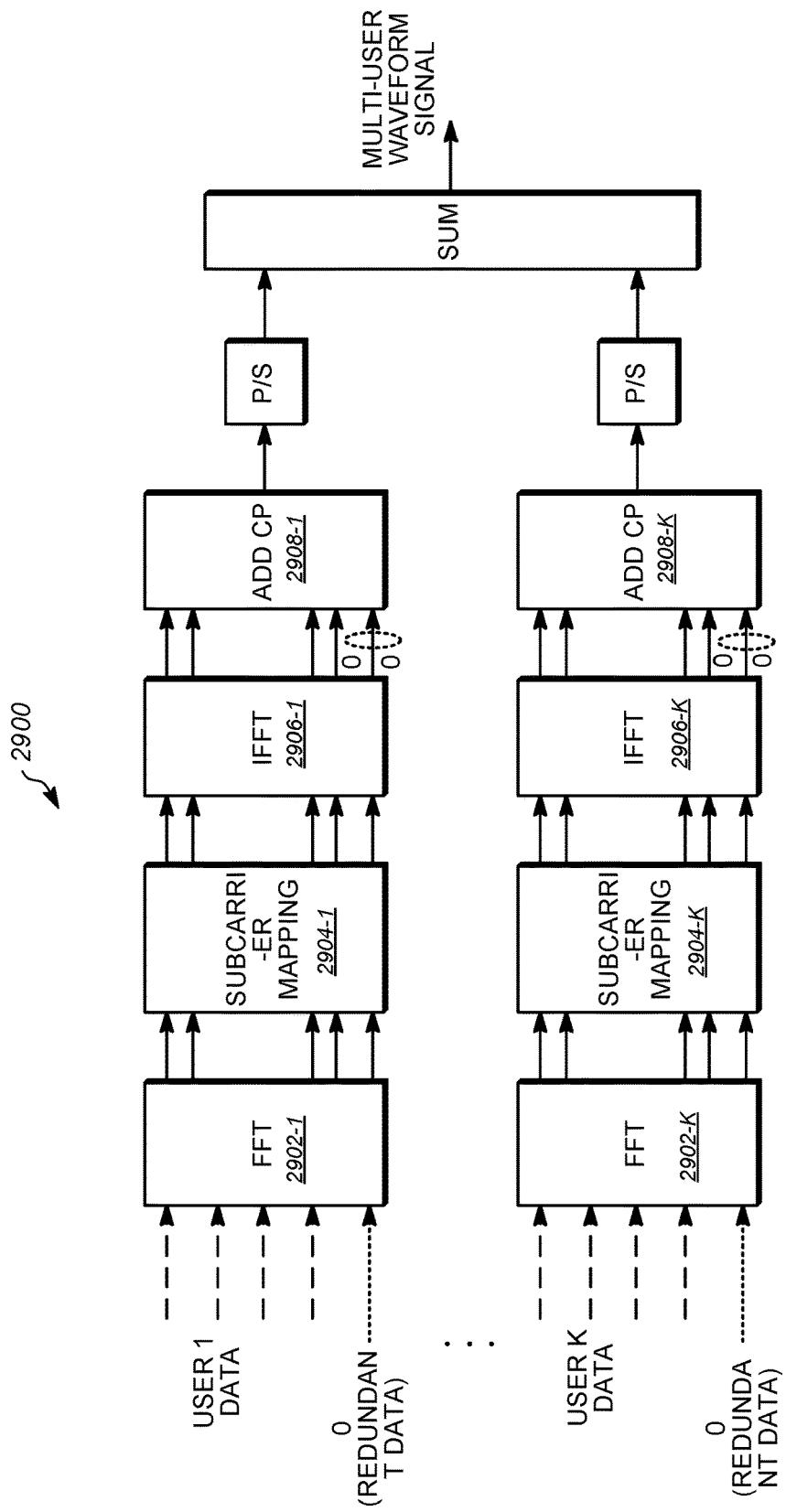
FIG. 29 illustrates an example of a multi-user multiplexing solution for hybrid-s-OFDM.

Multi-user multiplexing for hybrid-s-OFDM may be provided. As illustrated in FIG. 29, a plurality of users may be multiplexed using hybrid-s-OFDM systems. The multi-user multiplexing may be used in both UL and DL. For example, a hybrid-s-OFDM transmitter 2900 may use FFT (or DFT-S) modules 2902-1 to 2902-K to spread the transmitted signal or data including zeros for users 1 to K, and convert signal/data of users 1 to K to frequency domain. As illustrated in FIG. 29, subcarrier mapping modules 2904-1 to 2904-K may be used to map spread signal or data of users 1 to K to subcarriers of corresponding IFFT modules 2906-1 to 2906-K in frequency domain. IFFT modules 2906-1 to 2906-K may be used to convert frequency-domain signal or data of users 1 to K to time-domain signal or data and generate LPT. CP add modules 2908-1 to 2908-K may be used to add or attach LPCP to the resulting time-domain signal or data of users 1 to K.

Figure 30:
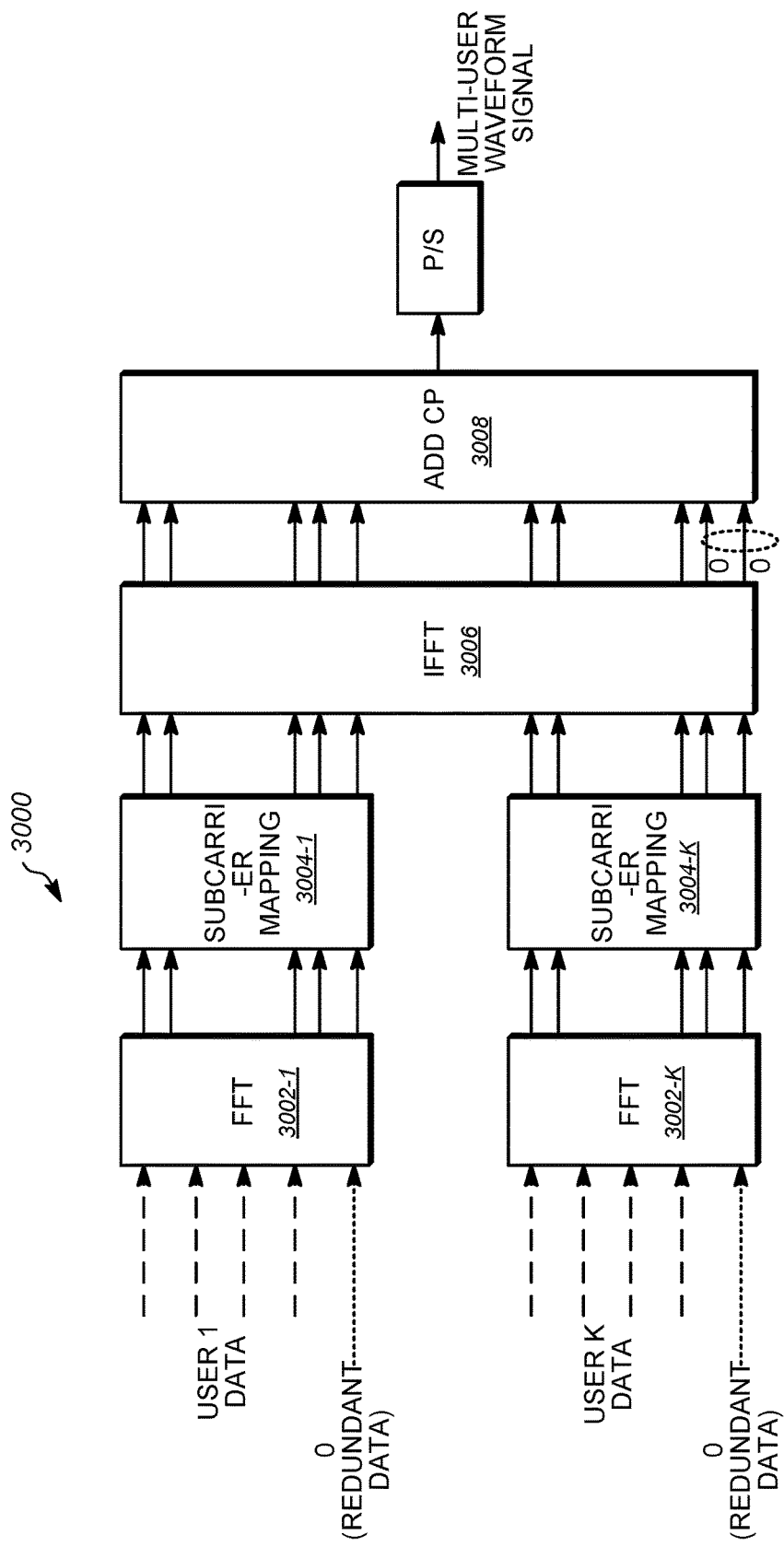
FIG. 30 illustrates an example of a multi-user multiplexing solution for hybrid-s-OFDM.

FIG. 30 illustrates an example of multi-user multiplexing for Hybrid-s-OFDM. For example, a hybrid-s-OFDM transmitter 3000 may use FFT (or DFT-S) modules 3002-1 to 3002-K to spread the transmitting signal or data including zeros associated with users 1 to K and convert signal/data of users 1 to K to frequency domain. The transmitter 3000 may use subcarrier mapping modules 3004-1 to 3004-K to map spread signal or data of users 1 to K to subcarriers in frequency domain. The transmitter 3000 may use an IFFT module 3006 to convert frequency-domain signal or data to time-domain signal or data and generate LPT. The transmitter 3000 may use a CP add module 3008 to add or attach LPCP to the resulting time-domain signal or data.

CP and/or hybrid-s-OFDM waveforms may have similar and/or comparable performances. Systems based on CP and/or hybrid-s-OFDM waveforms may outperform the systems based on ZT waveform.

Systems, methods, and instrumentalities are disclosed to handle ISI, e.g., due to dynamic tail length adaptation. The methods discloses herewith may be applicable to a waveform that may utilize dynamic adaptation of guard period and/or tail length. The term ZT may be replaced with approximate zero tail or unique word or guard or exact zero tail.

A symbol m in a subframe n may be denoted as $S_n^m$ and the ZT length of symbol m in subframe n may be $l(S_n^m)$. The total number of symbols in a subframe may be M. K consecutive symbols in a subframe may be indexed by $S_n^{1:k}$.

The location (e.g., exact location) of switching point may depend on the type of adaptation—inter-subframe adaptation, intra-subframe adaptation.

In case of inter-subframe adaptation, ZT length may be switched across the subframe while the symbols within one subframe (e.g., all the symbols within one subframe) may have the same ZT length. Symbols belonging to the consecutive subframes may not have the same ZT length $l(S_n^1)$ $!= l(S_{n-1}^M)$ for at least one subframe n>1. In case of intra-subframe adaptation, switching point may be located within a subframe, e.g., at least two symbols in a subframe may have a different ZT length. $l(S_n^m) != l(S_n^{m-1})$ for at least one symbol where m>1 & m<=M.

Inter-symbol interference (ISI) may occur at switching point. When $l(S_n^1) > l(S_{n-1}^M)$, the symbol $l(S_n^1)$ may suffer from ISI. When $l(S_n^m) > l(S_n^{m-1})$ for m>1 & m<=M the symbol $l(S_n^m)$ may suffer from ISI. This may include scenarios where the symbol n has cyclic prefix (e.g., only cyclic prefix), e.g., ZT length of zero, followed by a symbol n+1 with non-zero ZT length. For example, when ZT is switched from a shorter length to a longer length, the symbol at the switching boundary may experience ISI. This may be due to the symbols in ZT waveform not being self-contained and/or depend on the tail in previous symbol to account for channel delay spread.

ISI at switching point between short ZT to long ZT may be addressed as disclosed herewith. ISI may occur, for example, when switching from a group of two or more symbols (e.g., with shorter tail length) to one or more symbols (e.g., with a longer tail length). The last symbol in the group with shorter tail length may use extended length ZT that is at least equal to the longer tail length of subsequent symbol group. The scheduler may know (e.g., know in advance) the future allocations (e.g., the next allocation and/or subframe), to signal length of the last symbol to the receiver with shorter delay spread. A WTRU may receive additional field in DCI, e.g., to indicate the exact length of ZT in the last symbol.

Addressing ISI at switching point between short ZT to long ZT may include a predefined ZT length, e.g., at the end of allocation and/or subframe. In an example, the last symbol of an allocation and/or a subframe may use a zero tail (e.g., a zero tail that is equal to a predefined ZT length), for example, equal to common channel ZT length. WTRUs may assume a common channel ZT length at the end of allocation and/or subframe, independent of the WTRU specific ZT length signaled and/or used for other symbols in the allocation or subframe. Hybrid solutions may be possible, e.g., where the subframe boundaries use predefined ZT length, whereas the WTRU specific allocations within the subframe may use extended ZT length. Additional zeros for extended ZT and/or predefined ZT may be generated as disclosed herein.

Addressing ISI at switching point between short ZT to long ZT may include enhanced Zero Head—eZH. Exact zero head may be used (e.g., may be used instead of zero tails). A symbol may be self-contained and may not depend on previous symbol to account for channel delay spread. This waveform may provide much more flexibility to switch the zero head on the fly, e.g., even on symbol level granularity.

Systems, methods, and instrumentalities are disclosed to implement LPT and HGI length adaptation. The length of low power tail (LPT), and therefore HGI may vary from symbol to symbol, transmission time interval (TTI) to TTI (e.g., for the same user), and may take different LTP and/or HGI lengths, e.g., for different users simultaneously.

The length of the LPT and/or HGI may be set, e.g., by changing the number of zeros fed at the tail of the DFT for hybrid-s-OFDM. The head may be fed with non-zero number of zeros, e.g., to further reduce tail power and/or out-of-band (OOB) emissions. The non-zero number of zeros to create zero head may be in addition to the number of the zeros fed to obtain required tail length.

The length of low power tail (LPT) and/or hybrid guard interval (HGI) may be driven by one or more following factors: the amount of delay spread to be addressed in a given TTI(s) (e.g., the amount of delay spread to be addressed in a given TTI(s) for a specific user, user group and/or beam, etc.), the length of the prefix and/or suffix or other purpose where the LPT and HGI may be used. A prefix and/or a suffix factor may be considered, for example, if a prefix or suffix such as pilot and/or unique word (UW) is utilized for different purposes, for example for synchronization, channel estimation, phase/gain tracking, identification of a specific user or a group of users based on prefix or suffix sequence or combination of both.

The length of LPT (and/or HGI) may be set differently for different physical layer control channels. This may be driven by a variety of factors. For example, the beam-width with which the physical layer control channels (e.g., each of the physical layer control channels) may be transmitted may be different and/or may require lengths of LPT (and/or HGI) (e.g., different lengths of LPT (and/or HGI)) to compensate to handle the required delay spreads.

The physical layer control channels may be transmitted with a beam-width, e.g., a wider beam-width compared to the physical layer data channels. The physical layer common control channel may be transmitted with a wider beam-width compared to physical layer dedicated control channel, e.g., even within the physical layer control channels. This may imply that the length of the LPT and/or HGI, to be utilized, may vary from physical layer control channels to physical layer data channels and/or within physical layer control and/or data channels, the LPT or HGI lengths may be different. The scenarios may not be restricted where the beam-width and/or the LPT or HGI length could be same (e.g., the same between physical layer control and/or physical layer data and/or physical layer common vs. physical layer dedicated channels).

Although features and/or elements are described in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for generating a hybrid spread waveform, the method comprising:
    generating the hybrid spread waveform comprising a data portion and a hybrid guard interval (HGI) portion, wherein the HGI portion comprises a fixed portion and an adaptive low power tail (LPT) portion, wherein the fixed portion comprises a fixed prefix portion or a fixed suffix portion, wherein the adaptive LPT portion is dynamically adapted based on channel delay spread and low power cyclic prefix (LPCP) length, wherein the fixed portion comprises a fixed LPCP; and
    transmitting the generated hybrid spread waveform comprising the data portion and the HGI portion.

2. The method of claim 1, wherein the LPCP length is calculated based on delay spread and power regrowth length.

3. The method of claim 1, wherein the adaptive LPT portion is generated using a zero tail (ZT), wherein the LPT is generated by inserting zeros at inverse fast Fourier transform (IFFT) or discrete Fourier transform (DFT) processing stage.

4. The method of claim 1, further comprising receiving one or more of a hybrid guard interval (HGI) length, an adaptive low power tail (LPT) length, or an indication of a number of zeros inserted before FFT or DFT, wherein one or more of the hybrid guard interval (HGI) length, the adaptive low power tail (LPT) length, or the indication of the number of zeros are received via a physical control channel, a medium access control information element (MAC IE) or radio resource control (RRC) signaling.

5. The method of claim 1, wherein a part of the adaptive LPT portion is used to carry data or control information.

6. The method of claim 1, wherein the fixed portion is a zero power prefix, and wherein the zero power prefix is generated based on zero padding (ZP).

7. The method of claim 1, further comprising receiving a control signaling indicating switching waveform type between a fixed-CP waveform and the hybrid spread waveform.

8. A wireless transmit/receive unit (WTRU) comprising:
    a processor configured to at least:
        generate a hybrid spread waveform comprising a data portion and a hybrid guard interval (HGI) portion, wherein the HGI portion comprises a fixed portion and an adaptive low power tail (LPT) portion, wherein the fixed portion comprises a fixed prefix portion or a fixed suffix portion, wherein the adaptive LPT portion is dynamically adapted based on channel delay spread and low power cyclic prefix (LPCP) length, wherein the fixed portion comprises a fixed LPCP; and
    a transmitter configured to at least transmit the generated hybrid spread waveform comprising the data portion and the HGI portion.

9. The WTRU of claim 8, wherein the LPCP length is calculated based on delay spread and power regrowth length.

10. The WTRU of claim 8, wherein the adaptive LPT portion is generated using a zero tail (ZT), wherein the LPT is generated by inserting zeros at inverse fast Fourier transform (IFFT) or discrete Fourier transform (DFT) processing stage.

11. The WTRU of claim 8 comprising a receiver configured to at least receive one or more of a hybrid guard interval (HGI) length, an adaptive low power tail (LPT) length, or an indication of a number of zeros inserted at inverse fast Fourier transform (IFFT) or discrete Fourier transform (DFT) processing stage.

12. The WTRU of claim 11, wherein one or more of the hybrid guard interval (HGI) length, the adaptive low power tail (LPT) length, or the indication of the number of zeros is received via a physical control channel, a medium access control information element (MAC IE) or radio resource control (RRC) signaling.

13. The WTRU of claim 8, wherein a part of the adaptive LPT portion is used to carry data or control information.

14. The WTRU of claim 8, wherein the fixed portion is a zero power prefix, and wherein the zero power prefix is generated based on zero padding (ZP).

15. The WTRU of claim 8 comprising a receiver configured to at least receive a control signaling indicating switching waveform type between a fixed-CP waveform and the hybrid spread waveform.

\* \* \* \* \*